United States Patent [19]

Arai et al.

[11] Patent Number: 4,721,968

[45] Date of Patent: Jan. 26, 1988

[54] INK JET TRANSPARENCY-MODE RECORDER

[75] Inventors: Ryuichi Arai; Shigeo Toganoh, both of Tokyo; Kunitaka Ozawa, Isehara, all of Japan

[73] Assignee: Canon Kabushiki Kaisha, Tokyo, Japan

[21] Appl. No.: 650,245

[22] Filed: Sep. 13, 1984

[30] Foreign Application Priority Data

| | | | |
|---|---|---|---|
| Sep. 22, 1983 | [JP] | Japan | 58-174323 |
| Sep. 22, 1983 | [JP] | Japan | 58-174324 |
| Nov. 15, 1983 | [JP] | Japan | 58-213256 |

[51] Int. Cl.[4] ..................... G01D 18/00; G01D 15/18; H04N 1/21; B41J 11/50

[52] U.S. Cl. ..................... 346/136; 346/44; 346/45; 346/140 R; 358/296; 400/605

[58] Field of Search ..................... 346/74, 140 R, 1.1, 346/136, 44; 400/605; 355/89; 358/296

[56] References Cited

U.S. PATENT DOCUMENTS

| | | | |
|---|---|---|---|
| 4,087,825 | 5/1978 | Chen et al. | 346/75 |
| 4,353,079 | 10/1982 | Kawanabe | 346/140 R |
| 4,481,244 | 11/1984 | Haruta et al. | 428/155 X |
| 4,503,111 | 3/1985 | Jaeger et al. | 428/195 X |
| 4,617,580 | 10/1986 | Miyakawa | 346/136 |

FOREIGN PATENT DOCUMENTS

| | | | |
|---|---|---|---|
| 5682284 | 11/1979 | Japan | 400/120 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A process for recording an image by depositing droplets of a recording liquid onto a light-transmitting recording material is provided which comprises depositing at least two droplets of a recording liquid of the same color per image element onto the recording material. An apparatus for the process is also provided which comprises an image-forming means or a recording means useful for a reflective recording material and a light transmitting material.

2 Claims, 30 Drawing Figures

FIG. 3A
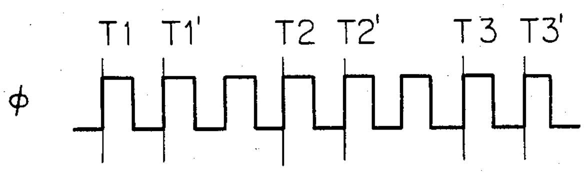
FIG. 3B
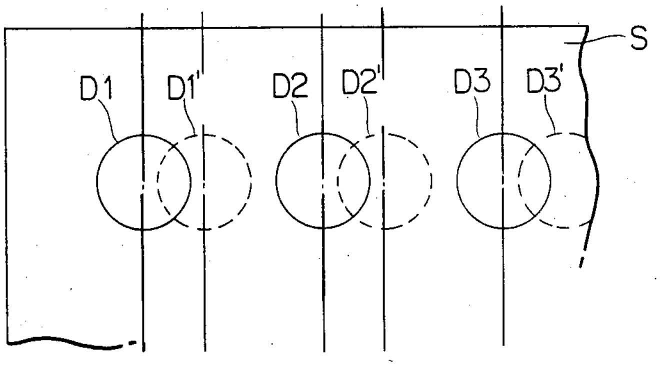
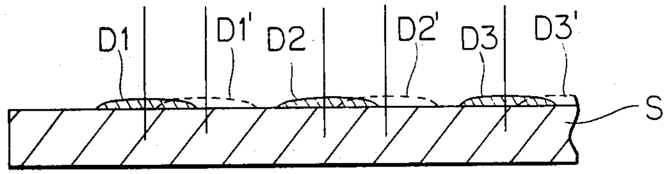
FIG. 3C

FIG. 6A
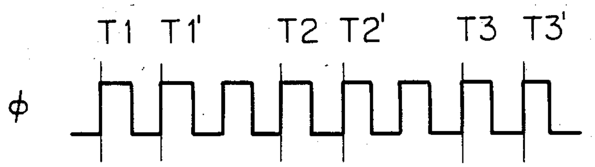
FIG. 6B
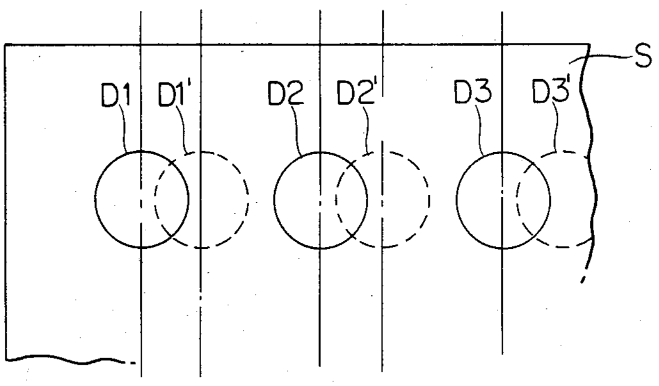
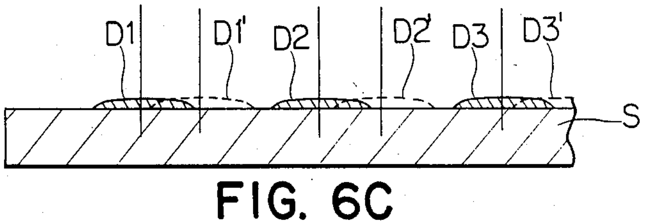
FIG. 6C

FIG. 10A
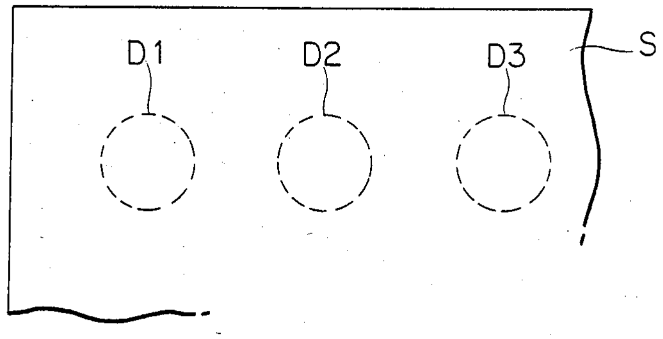
FIG. 10B
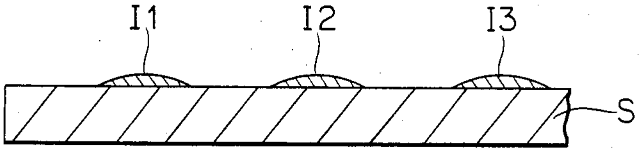
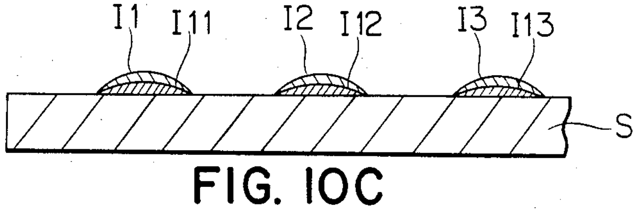
FIG. 10C

INK JET TRANSPARENCY-MODE RECORDER

BACKGROUND OF THE INVENTION

1. Field of the Invention

This invention relates to a process for recording an image on a light-transmitting recording material by an ink, and particularly to a process for recording by an ink, which can produce a clear projection image with a sufficient image density when the image recorded on the light-transmitting recording material is projected by light.

The present invention also relates to an apparatus for recording, which can form a good image not only on a reflective recording material but also on a light-transmitting recording material serving as an original for a film strip or an overhead projector (OHP).

2. Description of the Prior Art

Among processes for recording by an ink so far proposed, an ink jet recording process as a non-impact process can perform high speed printing and multicolor printing with less generation of noise, because the process can perform recording while generating droplets of a recording solution according to various methods for ejecting the recording solution, such as an electrostatic attraction method based on high potential application, a method for impacting mechanical vibrations or displacements to the recording solution by a piezoelectric element, a method for bubbling the recording solution by heating and utilizing the bubbling pressure, etc. and while sputtering and depositing the generated droplets onto a recording material, such as paper, etc.

The print recorded according to said ink jet recording process can be used in various applications, for example, observation in the form of a reflective image on the so called jet recording paper or fabric as a recording material, or observation in the form of projection of a recorded image from the light-transmitting resin film as a recording material onto a screen, etc. through an optical appliance such as a film strip, OHP, etc., or application in the form of CMF(color mosaic filter), etc. for color-resolving plates in preparing positive plates for color printing, or for color display in liquid crystal, etc.

When recording is applied to a recording material according to the ink jet recording process, an image to be recorded (the original) is generally divided into so many image elements (which are essentially different from image elements referred to herein as regards the present invention as will be defined later), and the original is reproduced on the recording material on the basis of the individual image elements of divided image as members for the original. However, when a reflective print is formed on paper or fabric as mentioned above according to such a recording process, a recorded image with a sufficient image density can be obtained, that is, a clear recorded image can be obtained, whereas, when a light-transmitting print is formed according to the same recording process, the light-transmitting recorded image with insufficient density can be often obtained, that is, an unclear image with a low density can be obtained when projected on a screen, etc.

An apparatus for recording, particularly such as a color graphic printer or a video printer, has two requirements, that is, one for the observation of a reflected image of a print on plane paper and one for the observation of a transmitted image of a print on a transparent film such as a slide, OHP, etc.

When printed both onto a reflective recording material and onto a light-transmitting recording material by one and same printer, the following disadvantage appears. That is, even if printing is made at the same predetermined recording density, a satisfactory print is observable on a reflective recording material, whereas an unsatisfactory print, particularly in density, is observable on a light-transmitting recording material due to a difference in the manner of observation between these two materials, so that a printed image of high quality cannot be obtained at the same time.

SUMMARY OF THE INVENTION

An object of the present invention is to provide a process for recording by an ink, which can produce a clear projection of an image with sufficient image density, when an image recorded by an ink on a light-transmitting recording material is projected through light transmission.

Another object of the present invention is to provide an apparatus for recording, which can always form an appropriate image, irrespective of the species of recording materials, by selecting an appropriate recording mode in accordance with the recording materials to overcome said disadvantage.

Still another object of the present invention is to provide an apparatus for recording, which comprises a first recording means for forming an image in a recording mode suitable for a reflective recording material and a second recording means for forming an image in a recording mode suitable for a light-transmitting recording material and which can form an image in an appropriate recording density for both types of the recording material to overcome said disadvantage.

A further object of the present invention is to provide an apparatus for recording, which comprises a plurality of recording means, and which can form an image in an appropriate recording density for any of a reflective recording material and a light-transmitting recording material by actuating a plurality of the recording means at the same time or selectively, to overcome said disadvantage.

According to one aspect of the present invention, a process for recording an image by depositing droplets of recording liquid onto a light-transmitting recording material is provided, which comprises depositing at least two droplets, per image element, of a recording liquid of the same color onto the recording material.

According to another aspect of the present invention, an apparatus for recording is provided, which comprises an image-forming means capable of forming an image in a first recording mode for a reflective recording material and of forming an image in a second recording mode for a light-transmitting recording material, the first recording mode performing a single recording operation for one and the same image element and the second recording mode performing a plurality of recording operations for one and the same image element.

According to a further aspect of the present invention, an apparatus for recording is provided, which comprises a first recording means capable of recording an image in a first recording mode for a reflective recording material and a second recording means capable of forming an image in a second recording mode for a light-transmitting recording material, the first recording mode performing a single recording operation for one and the same image element and the second recording mode performing a plurality of recording operations for one and the same image element.

According to a still further aspect of the present invention, an apparatus for recording is provided, which comprises a plurality of recording means for recording materials, and an actuation-controlling means for controlling the drive of the recording means in accordance with a first recording mode or a second recording mode, M number of the recording means being actuated in the first recording mode, where $M \geqq 1$, and N number of the recording means being actuated in the second recording mode, where $N > M$, thereby performing recording operations.

BRIEF DESCRIPTION OF THE DRAWINGS

FIGS. 3(A) through (C) is a diagram showing a recording mode.

FIGS. 6A(A) through (C) are diagrams showing the recording operation in the apparatus of FIG. 5.

FIGS. 10(A) through (C) are diagrams showing the recording mode in the apparatus of FIG. 9.

DETAILED DESCRIPTION OF PREFERRED EMBODIMENTS

Figure 1:
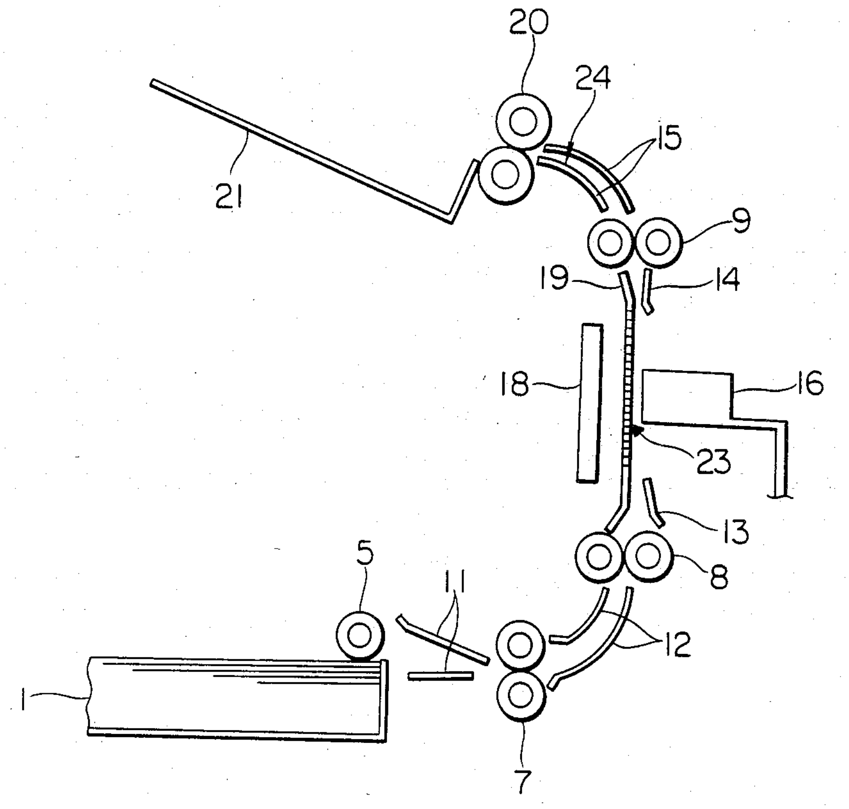
FIG. 1 shows a schematic structural view of an apparatus according to one embodiment of the present invention.

The present process and apparatus for recording by ink will be described in detail below, referring to specific embodiments.

In the case of a reflective type of print, almost all the light that enters and is reflected by the recording layer of a recording material bearing a recorded image and can undergo substantially two passages through the recording layer on the occasion of incidence and reflection, where the transmitted light is thoroughly absorbed and reflected according to the colors of recording agent components in a recording liquid. In the case of a light-transmitting print, on the other hand, almost all the light that enters the recording layer of a recording material bearing a recorded image undergoes only one passage through the recording layer, and it may be presumed that the absorption of the transmitted light through the recording layer according to the colors of recording agent components in a recording liquid is not enough for impacting a sufficient optical recording density to a projected image.

To impact a sufficient image density to a recorded image, one way is available, that is, to increase the concentrations of recording agent components in the recording liquid, but doing so still has a drawback that the recording liquid with high recording agent concentrations is not stable, etc. and consequently special measures must be taken into consideration when a recording liquid with good characteristics is prepared.

Under these circumstances, the present inventors have regarded a relationship between dots formed by droplets of a recording liquid deposited onto a recording material and an image, element concentration as important, and have made extensive studies on it and have found an ink jet recording process, which can record a print with a sufficient recorded image density observable as a transmitted image by producing a higher image element density.

That is, the present invention provides a process for recording an image by depositing droplets of a recording liquid onto a light-transmitting material, which comprises depositing at least two droplets, per image element, of a recording liquid of the same color in recording.

According to the present recording process, recording is made on a light-transmitting recording material with a recording liquid, where a sufficient image density can be impacted to an image projected from the recorded image through light transmission.

The image element referred to in the present invention is defined by a minimum region shared with the same color when an image is recorded, and an assembly of the image elements forms a recorded image. Thus, the image element referred to in the present invention is essentially different from the image element as one unit of the divided original as mentioned before.

To impact a sufficient image density to an image recorded according to the ink jet process, it is generally necessary to obtain a sufficient image element density. The image element density can be increased basically by sufficiently increasing a density of recorded (ink) dots or by recording the dots so as to share a region as broad as possible within one image element.

In view of these requirements, recording is made in the present recording process by depositing at least two droplets, per image element as defined above, of a recording liquid of same color onto a light-transmitting recording material.

In the present invention, a first mode of depositing a recording liquid onto the recording material is the said ink jet process, which comprises, more particularly, sputtering droplets of a recording liquid according to any of various methods for injecting a recording liquid, such as electrostatic attraction by a high potential application, impacting of mechanical vibrations or displacements to a recording liquid by a piezoelectric element, bubbling a recording liquid by heating and utilizing the bubbling pressure, etc., thereby depositing the droplets onto a light-transmitting recording material as dots. A second mode of depositing a recording liquid onto the recording material is the so called heat image transferring process.

Any recording liquid can be used in the first mode of the present process, so long as it can be used in the ink jet recording process.

The recording material used in the present invention has sufficient light transmissivity, and may be a light-transmissive plastic film coated by a water soluble polymer for accepting the recording liquid thereon.

In the present invention, at least two droplets of a recording liquid of the same color can be deposited within one image element by depositing droplets of a first recording liquid onto all the image elements to be recorded, then depositing droplets of a second recording liquid onto all the image elements on which the droplets of the first recording liquid have been deposited, and repeating these operations to successively deposit the droplets of other recording liquid of the same color, or alternatively by successively depositing droplets of a first recording liquid, droplets of a second recording liquid, droplets of a third recording liquid and so forth for each image element.

Recording of dots into an image element can be carried out under control by signals transmitted corresponding to an image to be recorded (original).

At least two droplets of a recording liquid of the same color deposited within one image element can be recorded in the form of at least one dot including at least two partially superposed dots, or in the form of a plurality of dots. To obtain a higher image element density without impairing the resolvability of the recorded image, it is preferable to record at least two dots including at least an overlapped part thereof.

The image thus recorded as a superposition of dots according to the present recording process can satisfy at least one of said requirements for obtaining a higher image element density, and can be a clear image having a sufficient image element density.

That is, when a plurality of dots of the same color are recorded, as superposed or partially superposed, within one image element, it is needless to say that the recording agent components of a recording liquid are deposited more at the superposed part of the dots than at the non-superposed parts, and thus the density of the dots can be increased and consequently the recording density throughout the image can be increased. Even if a plurality of dots of the same color are recorded apart from one another within one image element, the region which the dots can share within one image element can be broadened, and thus the quantity of light passing through the recording layer of a recording material can be increased, and consequently the quantity of light absorbed depending on the colors of the recording agent components can be increased, giving a sufficiently high image element density.

According to the present ink jet recording process with a light-transmitting recording material, a clear projected image with a sufficient image density can be obtained when an image recorded on the light-transmitting recording material is projected through light transmission, and a print suitable for the observation of transmitted image can be recorded.

The recording process of the present invention will be described below in detail referring to the examples of an ink jet system.

EXAMPLE

Printing (sputtering) was carried out in two runs onto a light-transmitting recording material prepared by applying gelatin onto a 100 μm-thick polyester film to a layer thickness of 20 μm as dried after the application by means of an ink jet color printer JP-1210 (trademark manufactured by Canon K.K., Japan) so that dots of the same color can be superposed at one and same position to form a test pattern (in which black, yellow, Magenta and Cyan were printed to be solid successively in this order 4 squares of 2 cm×2 cm arranged side by side on the recording material) and a circle graph (a circle graph having segments colored successively with yellow, Magenta, Cyan, Red and Green in this order, with country names, Japan, USA, Germany, Britain and France printed in black letters successively in this order in the segments starting from the yellow segment, and with the title "circle graph" printed under the circle graph). Two runs of typing so as to superpose dots of the same color in one and the same position were carried out by depositing droplets of a first recording liquid onto all the predetermined image elements, to record dots, and then depositing droplets of a second recording liquid to superpose the dots on the dots recorded with the first recording liquid. The recording liquid used had the same color.

The recorded test pattern and circle graph were evaluated for the recording states in the following manner, and the results are shown in the Table 1.

Transmitted optical density of the recorded images was measured for the printed solid part of the test pattern with the respective colors by a photodensitometer (NLM-STD-Tr, made by Narumi Co., Ltd. Japan).

Furthermore, the projected image was evaluated according to a panel test. The panel test was carried out as follows: The circle graph as obtained above was projected onto a screen by OHP (overhead projector) and the projected image was visually examined and evaluated for its visual observability by ten panellists. When at least 8 panellists judged in visual observation that the projected image was wholly clear, the coloring of each color was projected good and the country name and title in black letters were displayed clear and easily readable, the panel test result was evaluated "satisfactory" as marked by "0", whereas, when 7 or less panellists made the same judgement as above, the panel test result was evaluated "unsatisfactory", as marked by "X".

Furthermore, three runs of printing (sputtering) were carried out in the same manner as above to superpose dots of the same color at one and same position, and the same test pattern and circle graph as above were recorded. The recording states of the recorded test pattern and circle graph were evaluated in the same manner as above. The results are shown in the following table.

COMPARATIVE EXAMPLE

Test patterns and circle graphs were recorded in the same manner as in the Example except that only one run of printing (sputtering) was carried out within the predetermined image elements with ink dots of same color. The resulting recorded image was evaluated in the same manner as in the Example, and the results are shown in the following Table.

TABLE

| | | Transmitted optical density | | | | Evaluation |
|---|---|---|---|---|---|---|
| | | Black | Yellow | Magenta | Cyan | by panelists |
| Example | 2 runs | 0.46 | 0.48 | 0.40 | 0.41 | O |
| | 3 runs | 0.68 | 0.78 | 0.58 | 0.61 | O |
| Comp. | 1 run | 0.21 | 0.23 | 0.18 | 0.19 | X |

TABLE-continued

| | Transmitted optical density | | | | Evaluation |
|---|---|---|---|---|---|
| | Black | Yellow | Magenta | Cyan | by panelists |
| Ex. | | | | | |

A first embodiment of the present apparatus for recording will be described in detail below, referring to Figures.

FIG. 1 shows one embodiment of an ink jet printer according to the present invention, where numeral 1 is a cassette containing the ordinary recording paper or transparent resin film; numeral 5 is a pickup roller for feeding the recording paper or the transparent resin film from the cassette; numeral 7 is a pair of timing rollers numerals 8 and 9 are pairs of feed rollers; numerals 11, 12, 13, 14 and 15 are feed guides which constitute routes for smoothly conveying the recording paper or film 4; numeral 16 is an ink jet recording head provided in a direction substantially perpendicular to the conveyed recording paper or film.

An aqueous ink is supplied to the ink jet recording head 16 from an ink storage tank, not shown in the drawing, and an image is reproduced on the recording paper or film conveyed from the cassette 1 according to an image signal supplied from an image reading means. The recording head is constituted as the full multi-head arranged in full line in a direction perpendicular to the conveying direction of recording paper or film, that is, in a perpendicular direction to the paper surface in the drawing.

Numeral 18 is a suction fan; numeral 19 is a porous guide plate which attracts the recording paper or film by suction of the suction fan 18 to keep the flatness of the recording paper or film, and thereby to keep the best distance between the recording material and the recording head 16.

Numeral 20 is a pair of discharge rollers and numeral 21 is a discharge tray. After recording by the recording head 16, the recording paper or film is conveyed to the pair of the discharge rollers 20 through the pair of feed rollers 9, and then discharged into the discharge tray 21 through the pair of discharge rollers 20.

Numerals 23 and 24 are a first sensor and a second sensor, respectively, for detecting the recording material, provided on the route for conveying the recording material. The first sensor 23 is provided in the conveying direction just before the recording position of the ink jet recording head 16, and driving control of the recording head 16 is conducted by the detection output from the first sensor 23. The second sensor 24 is provided in the conveying direction just before the pair of discharge rollers 20, and driving of the pair of discharge rollers 20 and the pair of feed rollers 9 is controlled on the basis of the detection output from the second sensor 24.

Figure 2A:
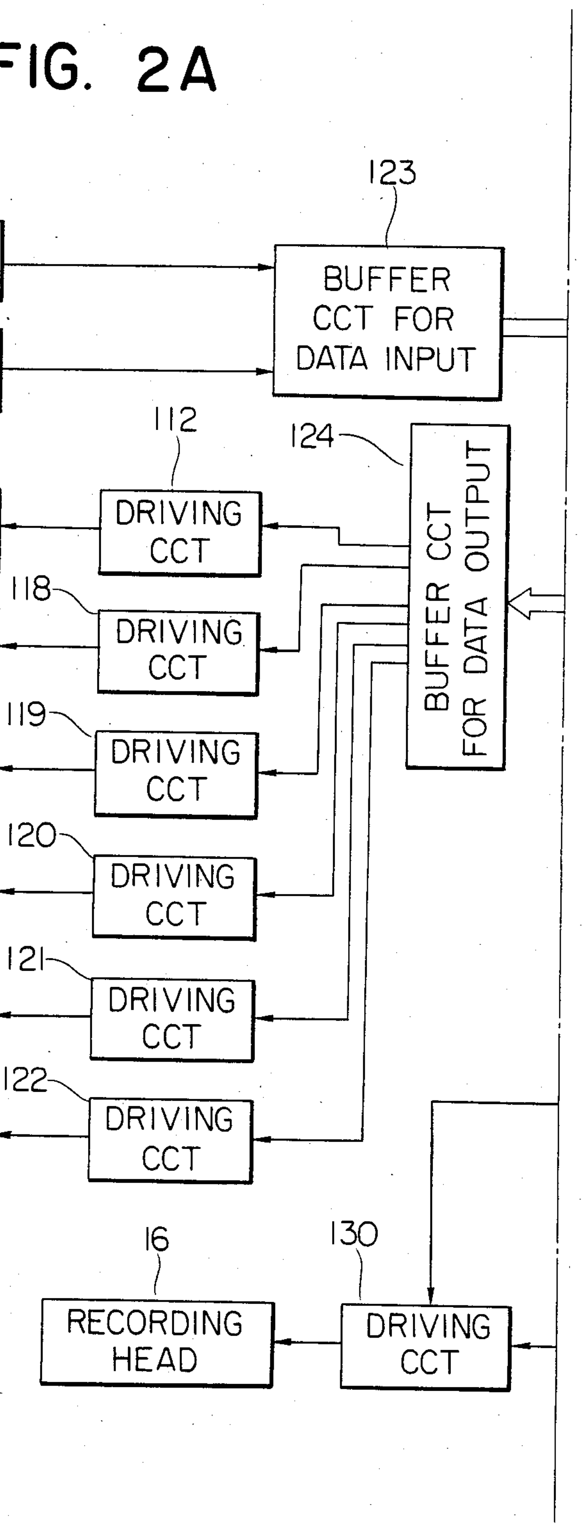
FIG. 2 composed of FIGS. 2A and 2B is a block diagram showing the control section of the apparatus of FIG. 1.
Figure 2A:
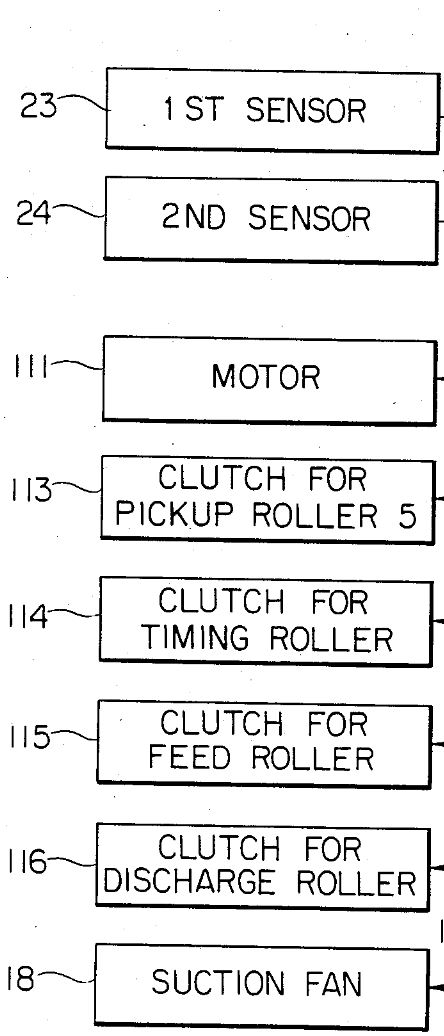
Figure 2:
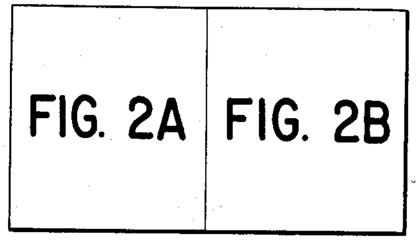

In FIG. 2 is shown a control system in the apparatus of FIG. 1, wherein numeral 100 is a control circuit for controlling the driving of the individual sections, numeral 101 is a read-only memory (ROM) encasing a control program, etc.; numeral 102 is a random-access memory (RAM); numeral 103 is an operating section. The operating section has, together with an operating section switch panel for designating the normal recording conditions, etc. such as number of recording copies, recording image density, etc., first and second mode-designating switches 104-1 and 104-2 for designating plane paper recording mode and film recording mode, respectively, and further has a display section 105 for displaying recording conditions, etc.

The input signal from the operating section 103 is supplied to the control section 100 through a buffer circuit 106 for data input and output. Furthermore, a driving circuit 107 is subjected to driving control from the control circuit 100 through the buffer circuit 106, whereby display is controlled in the display section 105.

Numeral 111 designates motors as driving sources for the respective rollers and numeral 112 is a driving circuit for on-off control of the motors 111. Numerals 113 through 116 are motor clutches for transferring motor revolution power to the pickup roller 5 and pairs of rollers 7, 8, 9 and 20, and are subjected to on-off control through driving circuit 118 through 121, respectively.

Numeral 122 is a driving circuit for on-off control of the suction fan 18. In the control circuit 100, driving signals are supplied to the respective driving circuits through an output buffer circuit 124 on the basis of the detection signals supplied from both sensors 23 and 24 through an input buffer circuit 123 to control driving of the conveying system.

Numeral 130 is a driving circuit for driving the ink jet recording head 16, and an image signal corresponding to the image information read by the image reading means, not shown in the drawing, is supplied to the driving circuit 130 through an image input interface 132 and an image memory 133. Furthermore, a driving signal from the control circuit 100 is supplied to the driving circuit 130 through an image-controlling circuit 134. The head 16 is energized by the driving circuit 130 on the basis of these two signals to form an image on the recording paper or film conveyed from the cassette 1.

Now, the plane paper recording mode and film recording mode will be described below:

As shown in FIG. 3(A), the recording head 16 is driven by a clock $\phi$ of definite cycle to inject ink droplets onto the surface of a recording material. In the plane paper recording mode, the head 16 is driven at every interval of three pulses in the clock $\phi$ (timing $T_1$, $T_2$, $T_3$ . . . ). In FIG. 3(B) and FIG. 3(C), symbol S shows a recording material, and full line D ($D_1$, $D_2$, $D_3$, . . . ) shows the injected ink droplets.

In the film recording mode, on the other hand, printing is carried out at the timing $T_1$, $T_2$, $T_3$ . . . and also printing is carried out at the timing $T_1'$, $T_2'$, $T_3'$ . . . As a result, dots $D_1'$, $D_2'$, $D_3'$ . . . are printed in a state superposed with dots $D_1$, $D_2$, $D_3$, . . . shown by dotted line in FIG. 3(B) and FIG. 3(C). Thus, ink ejection is carried out in two runs onto the same image element in this manner. According to said film recording mode, a reproduced image having a transmission density substantially equal to that for the plane paper can be obtained on a film whose image density would be insufficient owing to a high transmittance of the film if recorded in an equal recording density to that for the plane paper.

In the foregoing description, two runs of printing are carried out on a recording material conveyed at a constant speed for one and the same image element in the manner as given above, but it is needless to say that two runs of printing can be carried out for the same image element, for example, by intermittently conveying the recording material or by passing the recording material twice over the printing position of head 16.

Figure 4A:
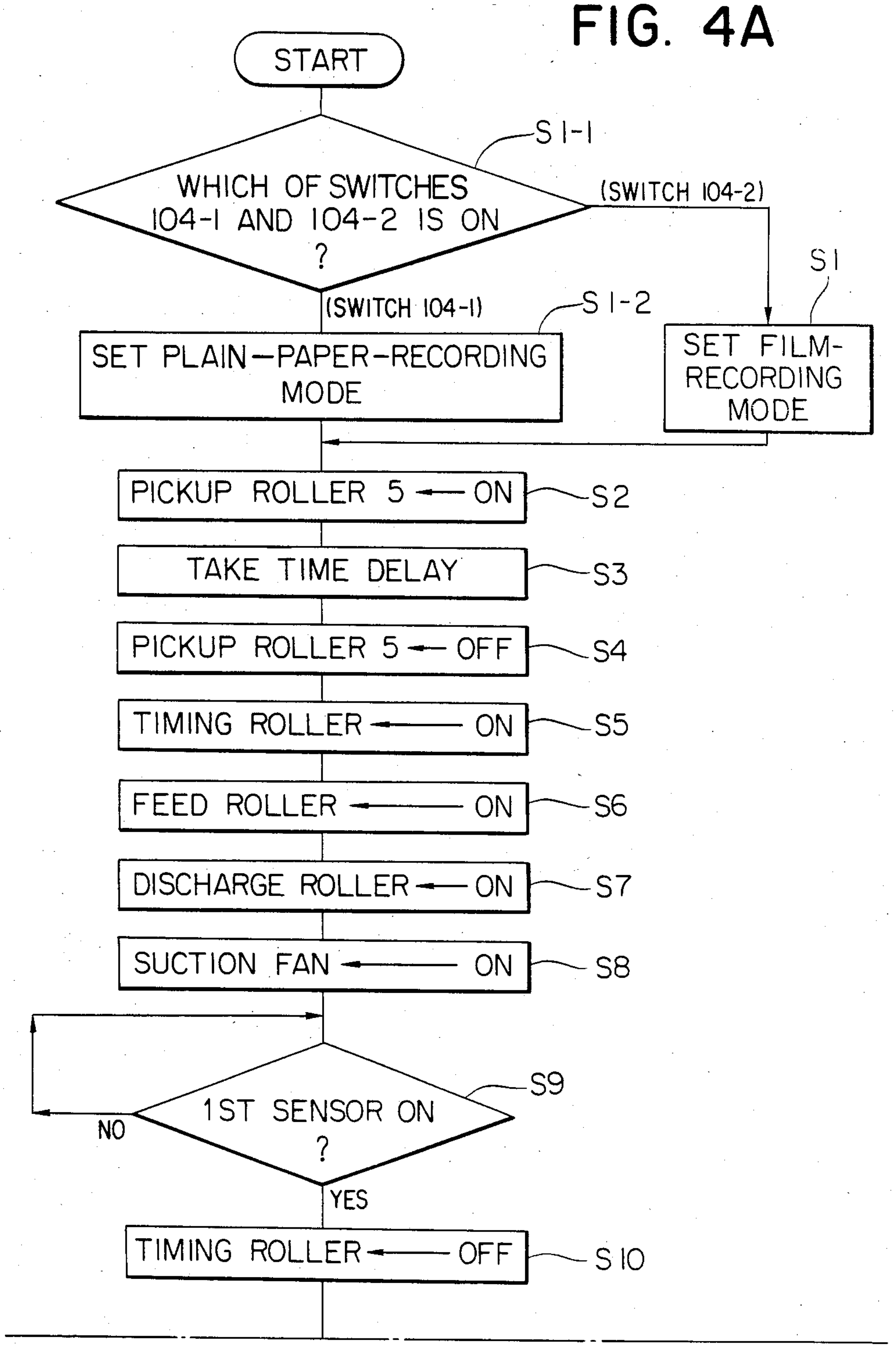
FIG. 4 composed of FIGS. 4A and 4B is a flow chart showing the recording operation in the apparatus of FIG. 1.
Figure 4B:
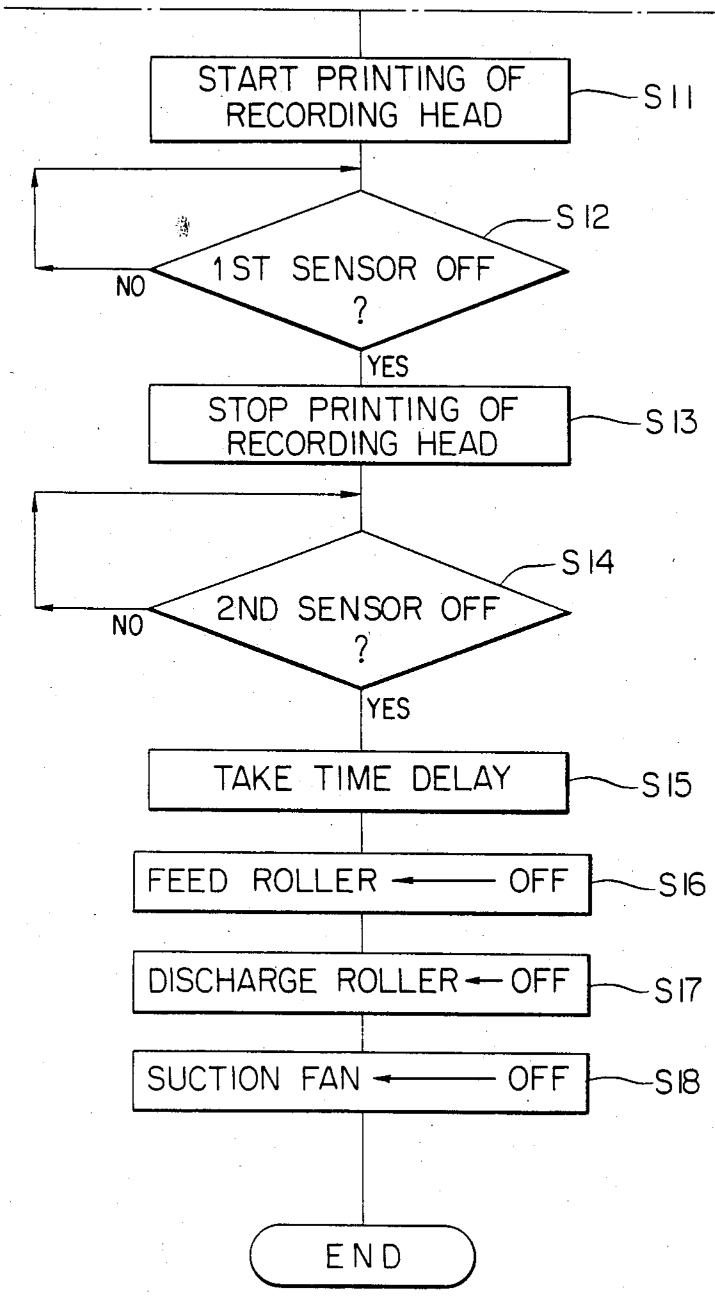
Figure 4:
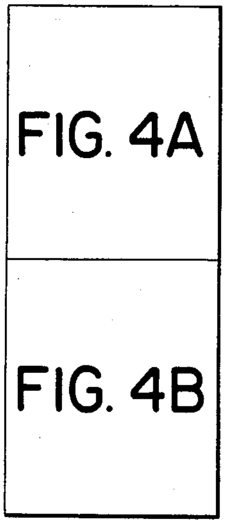

FIG. 4 shows recording operation onto a sheet of recording material in the apparatus of FIG. 1, where the step S1-1 judges which of the mode-designating switches 104-1 and 104-2 is on. When the switch 104-1 is on, the step S1-2 follows, and the recording mode is set to plane paper recording mode, whereas, when switch 104-2 is on, step S1-3 follows to set film recording mode. After the mode setting in this manner, the step S2 follows to start the revolution of the pickup roller 5, and any of the recording materials, i.e. recording paper or film, is conveyed from the cassette 1 toward the pair of timing rollers 7. Step S3 is provided with sufficient conveying time until the leading edge of the recording material has been engaged into the pair of timing rollers 7, and step S4 stops revolution of pickup roller 5. Then, steps S5, S6, S7 and S8 follow successively to start revolution of the pair of timing rollers 7, the pairs of feed rollers 8 and 9, and the pair of discharge rollers 20 and to turn on the suction fan 18 at the same time. As a result, the recording material can reach the pair of feed rollers 8 through the pair of timing rollers 7 and can be further conveyed through the pair of feed rollers 8.

Step S9 judges whether or not the leading edge of the conveyed recording material is detected by the first sensor 23. When the leading edge is detected, signal "yes" is transmitted, and step S10 follows to stop revolutions of the pair of timing rollers 7. Then, in step S11, the ink jet recording head 16 is driven to start printing onto the recording material. Since the recording mode is set in steps S1-2 and S1-3 as described above, printing is carried out according to the set mode.

The printing operation is continued until the trailing edge of the recording material has been detected by the first sensor 23. That is, when the trailing edge of the recording material is detected in step S12, step S13 follows to stop the printing operation.

The recording material with an image thus formed on its surface is conveyed toward the pairs of discharge rollers 20 through the pair of feed roller 9 and is discharged further toward the discharge tray 21 through the pair of discharge rollers 20. When the trailing edge of the recording material is detected by the second sensor 24 in step S14, step S15 follows to provide sufficient conveying time until the recording material have been discharged into the discharge tray 21. Then, steps S16 through S18 follow successively to stop driving of the pair of feed rollers 8 and 9, the pair of discharge rollers 20 and the suction fan 18. One sequence of recording operation for the recording material is completed in the manner as described above.

In the present apparatus for recording, a first recording mode for a reflective recording material and a second recording mode for a light-transmitting recording material are provided, and when a practically equal image density is designated, recording can be carried out on these two kinds of materials in the corresponding modes, and particularly a reproduced image with a practically sufficient transmission density can be obtained even on the light-transmitting recording material. Thus, the shortcoming of insufficiency of the image density which is met in observation of the image formed on a light-transmitting recording material and is caused by the high transmissivity of the recording material can be eliminated.

In the foregoing embodiment, the ink droplet injection (sputtering) is carried out in two runs for the same image element in the film recording mode, but the run number of the superposing deposition is not restricted to two. Namely, when an equal density is designated, a transmission density substantially equal to that of a reproduced image by plane paper recording must be obtained in a reproduced image by film recording.

In the present apparatus for recording, the recording means is not restricted only to the ink jet recording process, but, for example, a recording means of heat image transferring process can be also used.

Another embodiment of the apparatus for recording according to the present invention will be described in detail below.

Figure 5:
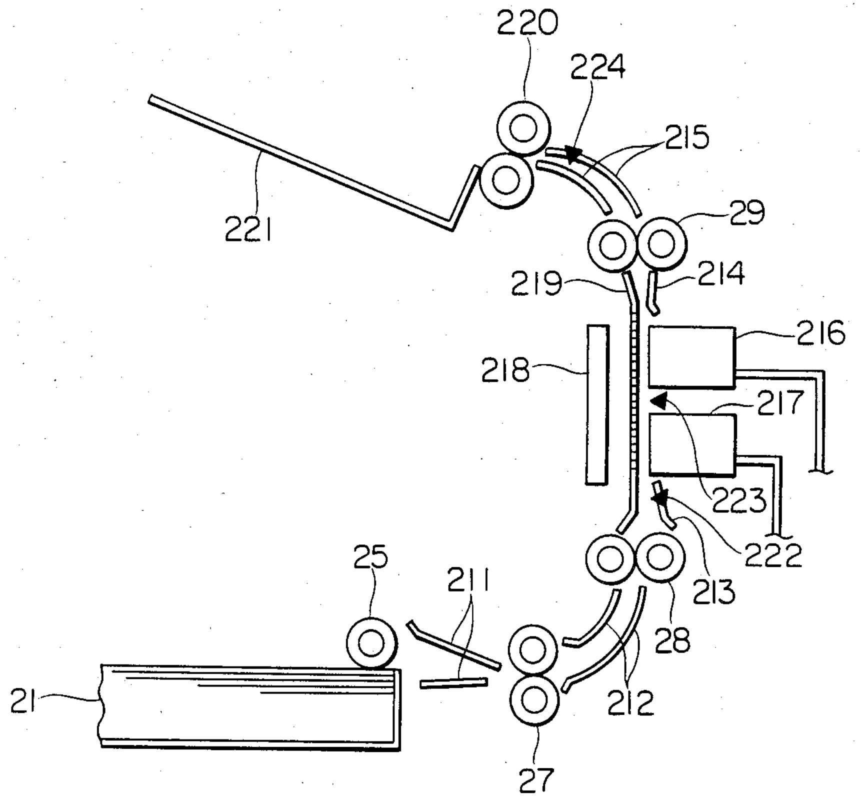
FIG. 5 is a schematic structural view of an apparatus according to another embodiment of the present invention.

In FIG. 5, another embodiment of an ink jet printer according to the present invention is shown, where numeral 21 is a cassette containing plane recording paper or transparent resin film; numeral 25 is a pickup roller for feeding the recording paper or transparent resin film from the cassette; numeral 27 is a pair of timing rollers numerals 28 and 29 are pairs of feed rollers; numerals 211, 212, 213, 214 and 215 are conveying guides which constitute routes for conveying the recording paper or film and also ensure its smooth conveying. Numerals 216 and 217 are first and second ink jet recording heads provided in series in the direction of conveying the recording paper or film.

An aqueous ink is supplied to both ink jet recording heads 216 and 217 from an ink storage tank not shown in the drawing, and an image is reproduced on the recording paper or film conveyed from the cassette 21 according to an image signal transmitted from an image reading means. These two recording heads are constituted as the full multiheads arranged in full line in the direction vertical to the direction of conveying the recording paper or film, that is, in the direction perpendicular to the paper surface in the drawing.

The first ink jet recording head 216 performs recording onto the recording material in a first recording mode suitable for recording onto the recording paper, whereas the second ink jet recording head 217 performs recording onto the recording material in a second recording mode suitable for recording onto the film. The first and second recording modes will be described later, referring to FIG. 6.

Numeral 218 is a suction fan and numeral 219 is a porous guide plate. The recording paper or film is attracted to the guide plate 219 through suction by the suction fan 218 to keep the flatness of the recording paper or film and also to keep the best distance between the recording material and the recording heads 216 and 217. Numeral 220 is a pair of discharge rollers and numeral 221 is a discharge tray. After the recording by the recording head 216 or 217, the recording paper or film is conveyed to the pair of discharge rollers 220 through the pair of feed rollers 29, and is discharged further into the discharge tray 221 through the pair of discharge rollers 220.

Numerals 222, 223 and 224 are first, second and third sensors, respectively, for detecting the recording material, which are provided in the conveying route for the recording material. The first sensor 222 is provided in the conveying direction just before the recording position by the second ink jet recording head 217, and the driving of recording head 217 is controlled by the detection output from the first sensor. Likewise, the second sensor 223 is provided just before the first ink jet recording head 216, and the driving of recording head 216 is controlled by the detection output from the second sensor. The third sensor 224 is provided in the conveying direction just before the pair of discharge rollers 220, and driving of the pair of discharge rollers 220, the pair of feed rollers 29, etc. is controlled on the basis of the detection output from the third sensor.

The first recording mode and second recording mode will be described below, referring to FIG. 6.

As shown in FIG. 6(A), the recording heads 216 and 217 are driven by clock $\phi$ of definite cycle to eject ink droplets onto the surface of recording material. In the first recording mode of the recording head 216, the head 216 is driven at every interval of 3 pulses of clock $\phi$ (timing T1, T2, T3, . . . ). In FIG. 6(B) and (C), symbol S shows the recording material, and the full line D (D1, D2, D3, . . . ) shows the ejected ink droplets.

In the second recording mode by the second recording head, on the other hand, printing is performed at timing T1, T2, T3, . . . and also at timing T1', T2', T3', . . . . As a result, dots D1', D2', D3', . . . are printed in a state overlapped with dots D1, D2, D3, . . . as shown by dotted line in FIG. 6(B) and (C). In this manner, ink ejection (sputtering) can be carried out in two runs for one and same image element. According to the second recording mode, a reproduced image with a substantially equal transmission density to that of a reproduced image recorded on the plane paper can be obtained on a film having a defect that image density obtained would be insufficient owing to the higher transmittance thereof, if recording is carried out in an equal recording density to that of the plane paper.

In the foregoing embodiment, two runs of ejection are carried out for the same image element on the recording material conveyed at a constant speed as described above, but it is needless to say that the second recording mode can be performed, for example, by intermittently conveying the recording material or by passing the film twice through the printing position of head 216, thereby conducting two runs of ejection for one and same image element.

Figure 7A:
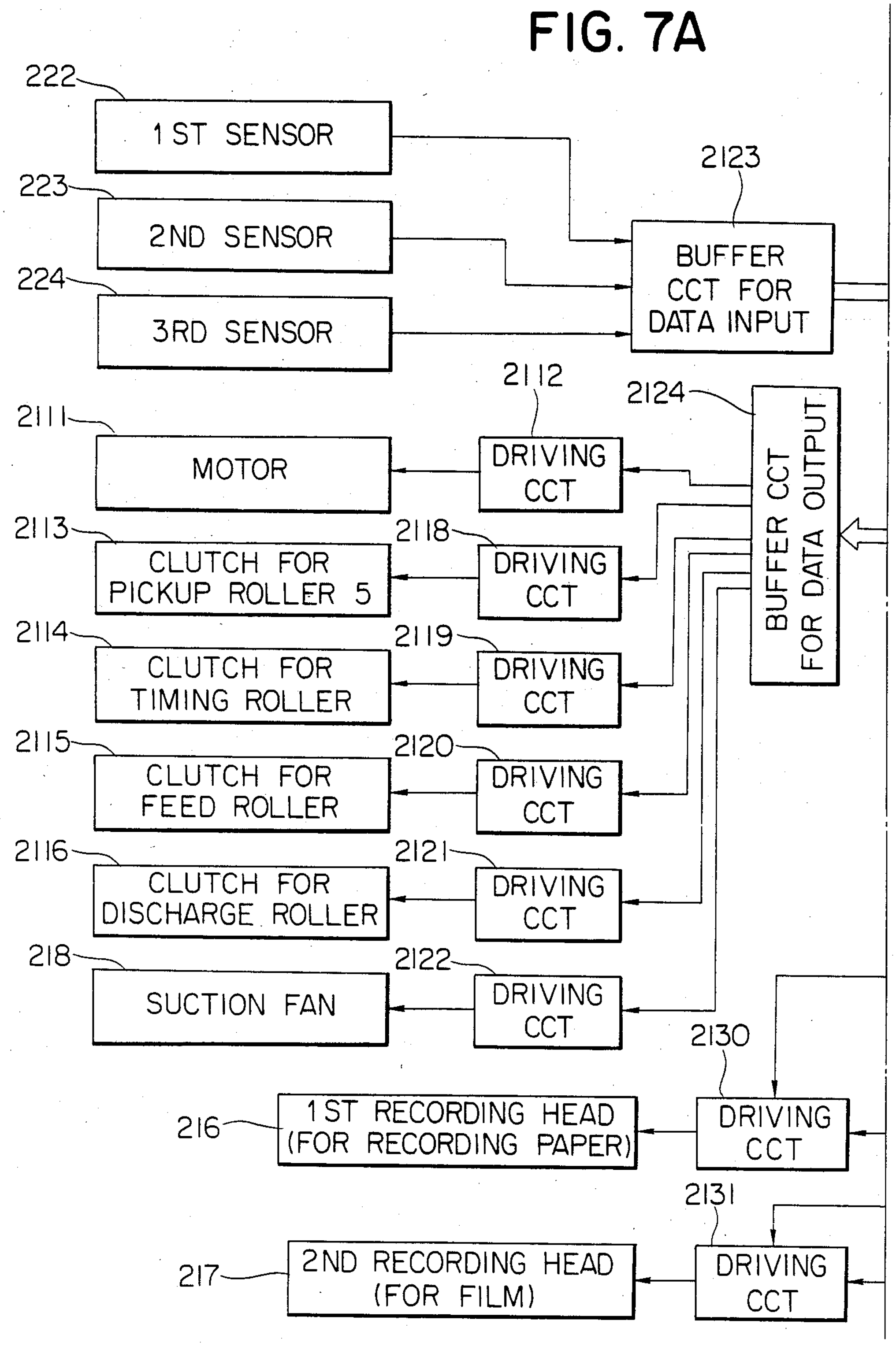
FIG. 7 composed of FIGS. 7A and 7B is a block diagram showing the control section of the apparatus of FIG. 5.
Figures 7, 7B:
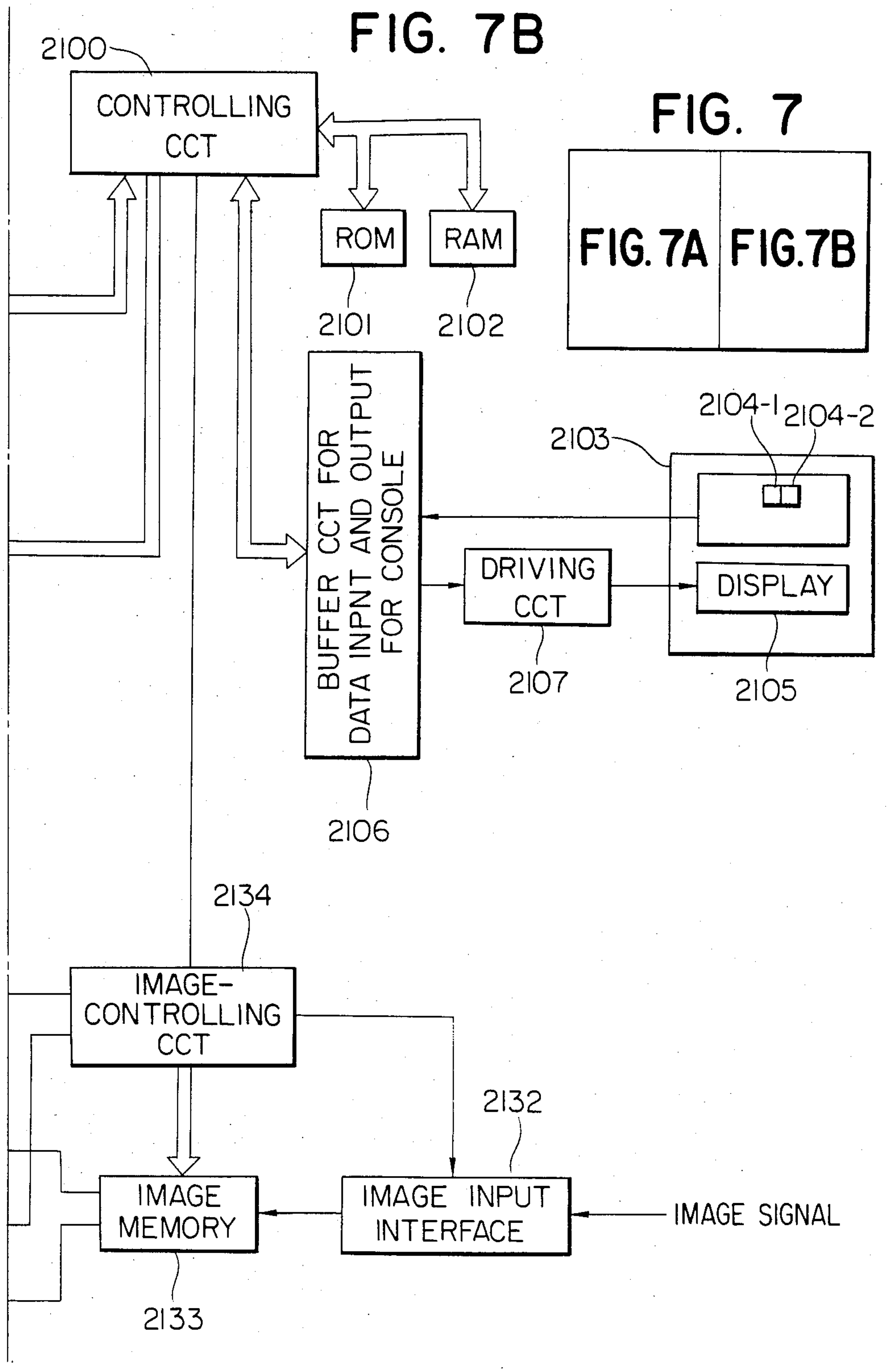

In FIG. 7, a control system in the apparatus of FIG. 5 is shown, where numeral 2100 is a controlling circuit for controlling the driving of the respectived sections; numeral 2101 is a read-only memory (ROM) encasing a control program, etc.; numeral 2102 is a freely readable and writable random-access memory (RAM) numeral 2103 is an operating section. The operating section has, together with an operation section switch panel for designating the normal recording conditions such as number of recording copies, recording image density, etc., first and second mode-designating switches 2104-1 and 2104-2 for designating the first and second recording mode, respectively and further has a display 2105 for displaying recording conditions, etc.

The input signal from the operating section 2103 is supplied to the control section 2100 through a buffer circuit 2106 for data input and output. Furthermore, a driving circuit 2107 is subjected to driving control by the control circuit 2100 through the buffer circuit 2106, whereby display is controlled in the display 2105.

Numeral 2111 designates motors as driving sources for the respective rollers and numeral 2112 is a driving circuit for on-off control of the motors 2111. Numerals 2113 through 2116 are motor clutches for transferring motor revolution power to the pickup roller 25, and pairs of rollers 27, 28, 29, and 220 and are subjected to on-off control through driving circuits 2118 through 2121, respectively.

Numeral 2122 is a driving circuit for on-off control of the suction fan 218. In the controlling circuit 2100, driving signals are supplied to the respective driving circuits through a buffer circuit for data output 2124 on the basis of the detection signals supplied from the respective sensors 22, 223 and 224 through a buffer circuit for data input 2123 to control driving of the conveying system.

Numerals 2130 and 2131 are driving circuits for driving the first and second ink jet recording heads 216 and 217, and an image signal corresponding to the image information read by the image reading means, not shown in the drawing, is supplied to both driving circuits 2130 and 2131 through an image input interface 2132 and an image memory 2133. Furthermore, a driving signal from the controlling circuit 2100 is supplied to the driving circuits 2130 and 2131 through an image-controlling circuit 2134. The respective head 216 or 217 is energized by the driving circuit 2130 or 2131 on the basis of these two signals to form an image on the recording paper or film conveyed from the cassette 21.

Figure 8A:
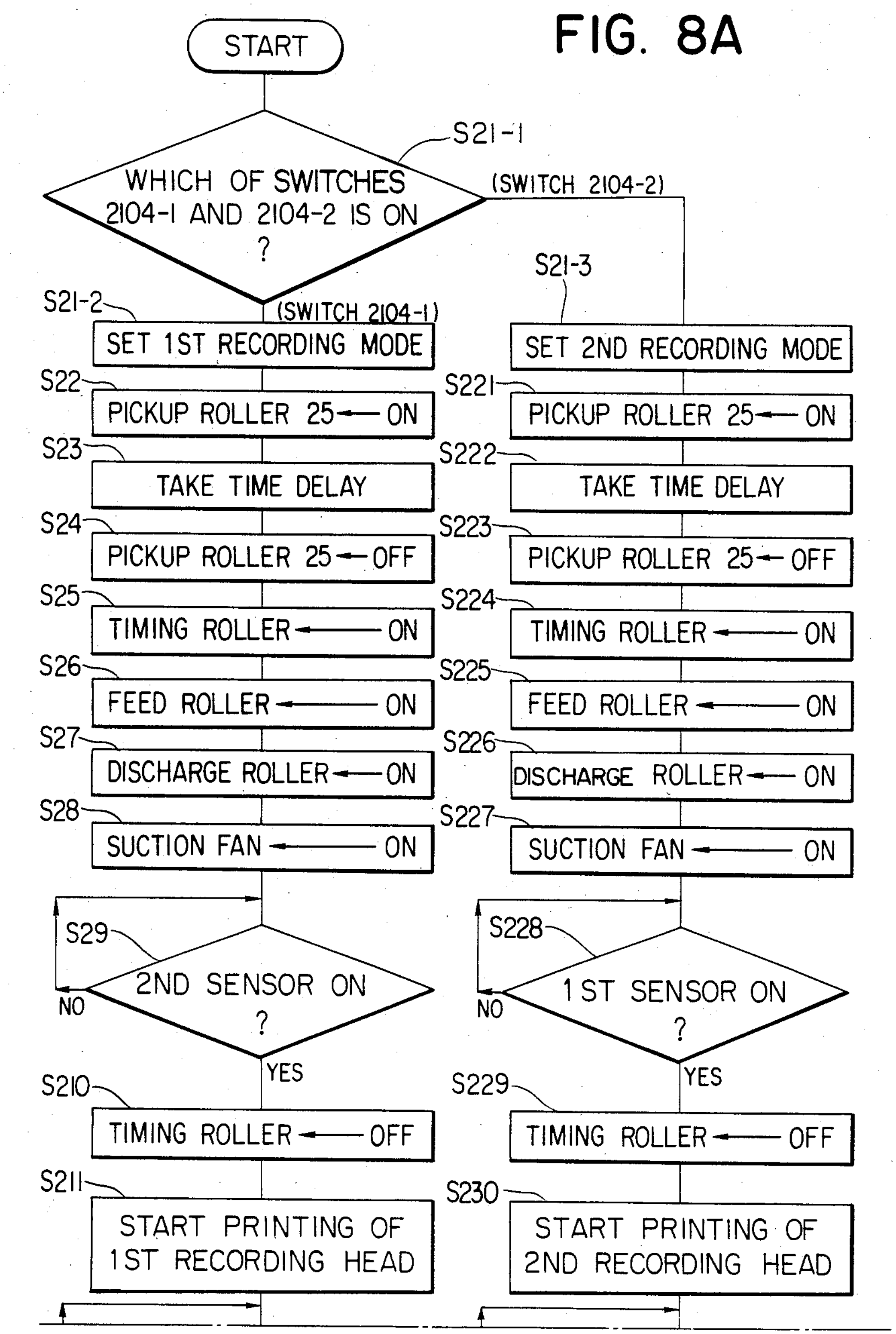
FIG. 8 composed of FIGS. 8A and 8B is a flow chart showing the recording operation in the apparatus of FIG. 5.
Figure 8B:
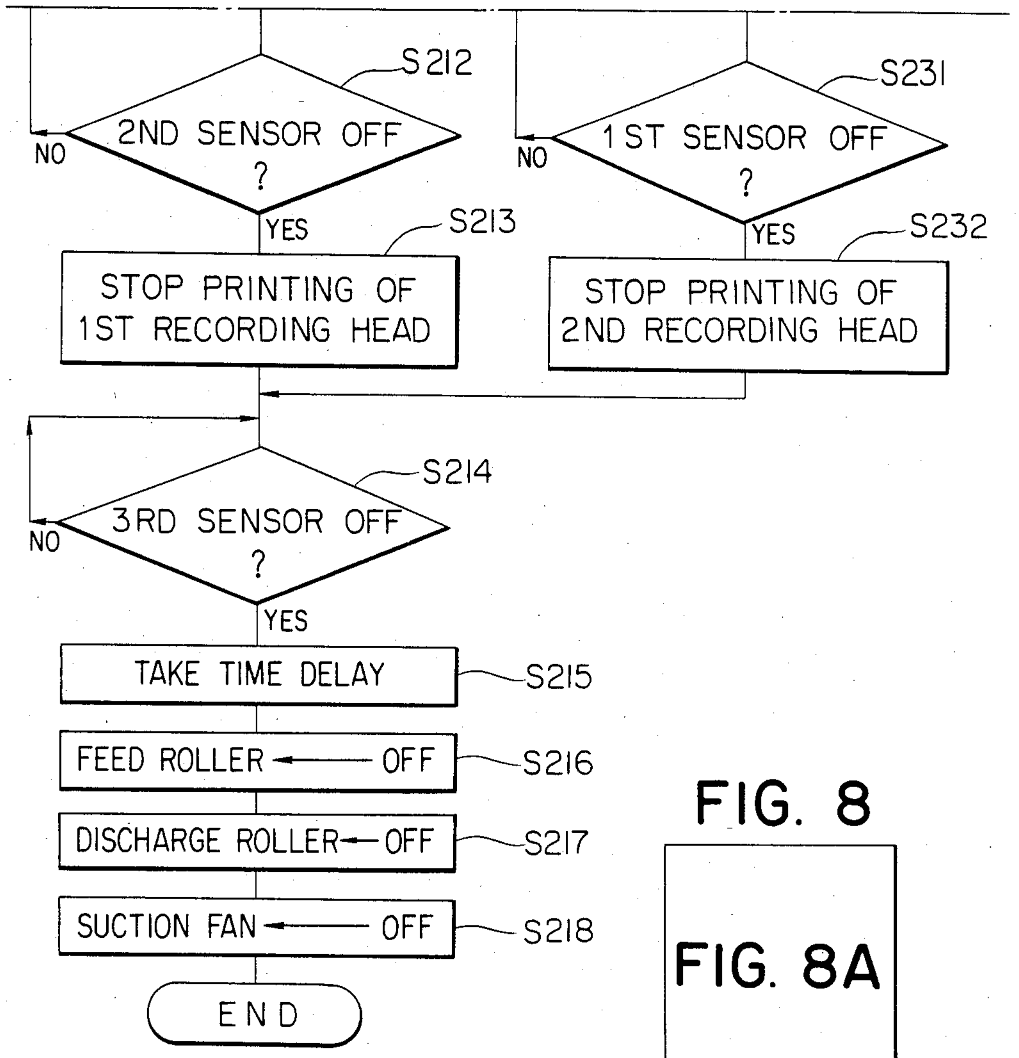
Figure 8:
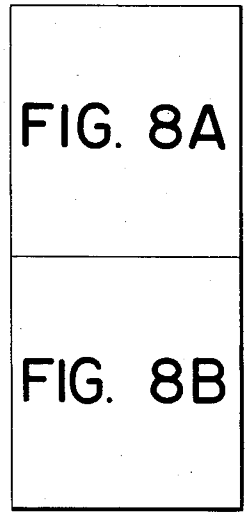

In FIG. 8 is shown recording operation onto a sheet of recording material in the apparatus of FIG. 5, where step S21-2 judges which of mode-designating switches 2104-1 and 2104-2 is on. When switch 2104-1 is on, step S21-2 follows, and the recording mode is set to the first recording mode, whereas, when switch 2104-2 is on, step S-21-3 follows to set the second recording mode. When the first recording mode is set, step S22 follows to start revolution of pickup roller 25, and the recording material is conveyed from the cassette 21 toward the pair of timing rollers 27. In that case, recording paper is encased in the cassette 21, and the recording paper is conveyed. Steps S23 provides sufficient conveying time until the leading edge of the recording paper has been engaged into the pair of timing rollers 27, and step S24 stops revolution of pickup roller 25. Then, steps S25, S26, S27 and S28 follow successively to start revolution of the pair of timing rollers 27, the pair of feed rollers 28 and 29 and the pair of discharge rollers 220 and to turn the suction fan 218 on at the same time. As a result, the recording paper can reach the pair of feed rollers 28 through the pair of timing rollers 27 and can be further conveyed through the pair of feed rollers 28.

Steps S29 judges whether or not the leading edge of the conveyed recording paper is detected by the second sensor 223. When the leading edge is detected, signal "yes" is transmitted, and step S210 follows to stop revolutions of the pair of timing rollers 27. Then, in step S211, the first ink jet recording head 216 is driven to start printing onto the recording paper. The printing operation is continued until the trailing end of the recording paper has been detected by the second sensor 223. That is, when the trailing end of the recording paper is detected in step S212, step S213 follows to stop the printing operation.

The recording paper with an image thus formed on its surface is conveyed toward the pair of discharge rollers 220 through the pair of feed rollers 29, and discharged further toward the discharge tray 221 through the pair of discharge rollers 220. When the trailing end of the recording paper is detected by the third sensor 224 in step S214, step S215 follows to provide sufficient conveying time until the recording paper has been discharged into the discharge tray 221. Then, steps S216 through S218 follow successively to stop driving of the pair of feed rollers 28 and 29, the pair of discharge rollers 220 and the suction fan 218. One sequence of recording operation for the recording paper according to the first recording mode is completed in the manner as described above.

Now, the operations when the switch 2104-2 turns on will be described below.

In this case, step S21-1 proceeds to step S221 through step S21-3, as described above. Step S221 starts revolution of pickup roller 25 to convey a recording material from the cassette 21 toward the pair of timing rollers 27. A transparent resin film is encased in the cassette 21 and is conveyed. Step S222 provides sufficient conveying time until the leading edge of the transparent resin film has been engaged into the pair of timing rollers 27, and step 223 stops revolution of pickup roller 25. Then, steps S224, S225, S226 and S227 follow successively to start revolutions of the pair of timing rollers 27, the pair of feed rollers 28 and 29, and the pair of discharge rollers 220, and to turn the suction fan 218 on at the same time. As a result, the transparent resin film can reach the pair of feed rollers 28 through the pair of timing rollers 27, and can be further conveyed through the pair of feed rollers 28.

Step S228 judges whether or not the leading edge of the conveyed transparent resin film is detected by the first sensor 222. When the leading edge is detected, signal "yes" is transmitted, and step S229 follows to stop revolution of the pair of timing rollers 27. Then, in step S230, the second ink jet recording head 217 is driven to start printing out the transparent resin film. The printing operation is continued until the trailing edge of the transparent resin film has been detected by the first sensor 222. That is, when the trailing edge of the transparent resin film is detected in step S231, step S232 follows to stop the printing operation.

The transparent resin film with an image thus formed on its surface is conveyed toward the pair of discharge rollers 220 through the pair of feed rollers 29, and discharged further toward the discharge tray 221 through the pair of discharge rollers 220. When the trailing edge of the transparent resin film is detected by the third sensor 224, step S215 follows to provide sufficient conveying time until the transparent resin film has been discharged into the discharge tray 221. Then, steps S216 through S218 follow successively to stop driving of the pair of feed rollers 28 and 29, the pair of discharge rollers 220 and the suction fan 218. One sequence of recording operation for the transparent resin film according to the second recording mode is completed in the manner as described above.

As described above, the apparatus for recording of the present invention has a first recording means for forming an image according to a first recording mode suitable for a reflective recording material, and a second recording means for forming an image according to a second recording mode suitable for a light-transmitting recording material, where a reproduced image with a practically sufficient transmission density can be obtained particularly even on a light-transmitting recording material by performing recording by the respective recording means corresponding to these two recording materials when a practically equal image density is designated. Thus, the trouble appearing when a transmitted image is observed, that is, an insufficient density of image formed in a light-transmitting recording material due to a large transmittance, can be eliminated.

In the foregoing embodiment, the ink droplet ejection (sputtering) is carried out in two runs for the same image element in the second recording mode suitable for recording on a film, but the run number of the overlapping sputtering is not restricted to two. That is, when an equal density is designated, a transmission density substantially equal to that of a reproduced image by plane paper recording must be obtained in a reproduced image by film recording.

In the apparatus for recording of the present invention, the recording means is not restricted only to the ink jet recording process, but, for example, a recording means of heat transfer proces can be also used.

Figure 9:
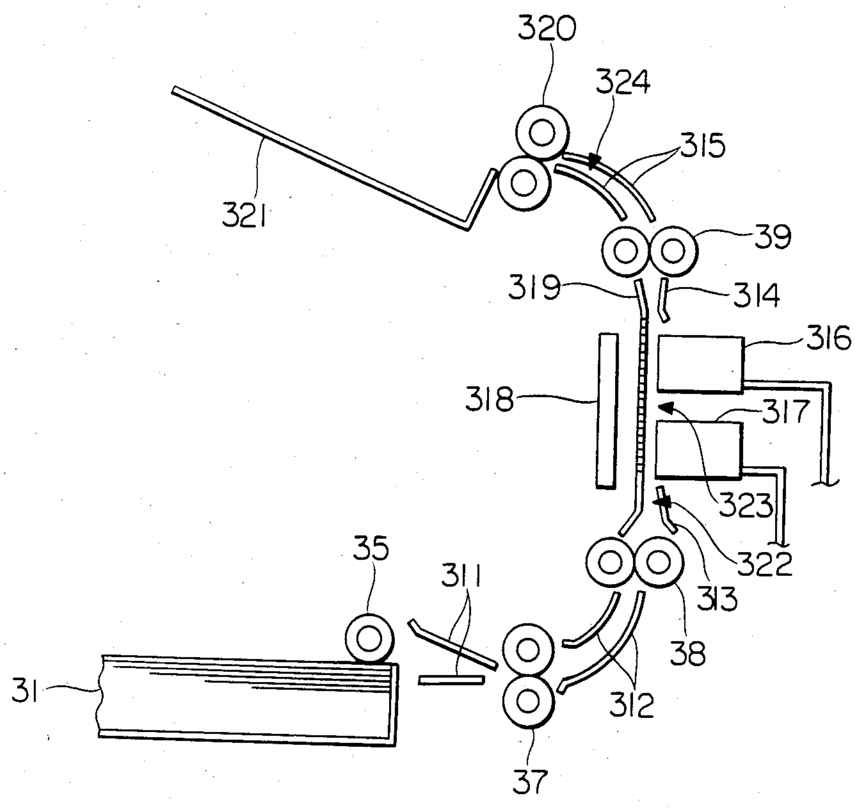
FIG. 9 is a schematic structural view of an apparatus according to other embodiment of the present invention.

In FIG. 9 is shown a further embodiment of an ink jet printer according to the present invention, where numeral 31 is a cassette containing plane recording paper or transparent resin film; numeral 35 is a pickup roller for feeding the recording paper or transparent resin film from the cassette; numeral 37 is a pair of timing rollers; numerals 38 and 39 are pairs of feed rollers; numerals 311, 312, 313, 314 and 315 are conveying guides which constitute routes for conveying the recording paper or film and also ensure its smooth conveying. Numerals 316 and 317 are first and second ink jet recording heads provided in series in the direction of conveying the recording paper or film.

In the present embodiment, both heads are so arranged as to make the mutual distance between the printing positions of these two recording heads smaller than the minimum width of the recording material to be conveyed.

An aqueous ink is supplied to both ink jet recording heads 316 and 317 from an ink storage tank, not shown in the drawing, and an image is reproduced on the recording paper or film conveyed from the cassette 31 according to an image signal transmitted from an image reading menas. These two recording heads are constituted as the full multiheads arranged in full line in the direction vertical to the direction of conveying the recording paper or film, that is, in the direction perpendicular to the paper surface in the drawing.

When a first recording mode suitable for recording onto the recording paper is designated, only the first ink jet recording head 316 is driven to perform recording onto the recording material, as will be described later, whereas, when a second recording mode suitable for recording onto the film is designated the first and second ink jet recording heads 316 and 317 are both driven to perform recording onto the recording material.

Numeral 318 is a suction fan and numeral 319 is a porous guide plate. The recording paper or film is attracted to the guide plate 319 through suction by the suction fan 318 to keep the flatness of the recording paper or film and also to keep the best distance between the recording material and the recording heads 316 and and 317. Numeral 320 is a pair of discharge rollers and numeral 321 is a discharge tray. After the recording by the recording head 316 or 317, the recording paper or film is conveyed to the pair of discharge rollers 320 through the pair of feed rollers 39 and is discharged further into the discharge tray 321 through the pair of discharge rollers 320.

Numerals 322, 323 and 324 are first, second and third sensors, respectively, for detecting the recording material, which are provided in the conveying route for the recording material. The first sensor 322 is provided in the conveying direction just before the recording position by the second ink jet recording head 317, and the driving of recording head 317 is controlled by the detection output from the first sensor. Likewise, the second sensor 323 is provided just before the first ink jet recording head 316, and the driving of recording head 316 is controlled by the detection output from the second sensor. The third sensor 324 is provided in the conveying direction just before the pair of discharge rollers 320, and driving of the pair of discharge rollers 320, the pair of feed rollers 39, etc. is controlled on the basis of the detection output from the third sensor.

Now, the first recording mode and second recording mode will be described below, referring to FIG. 10.

In FIG. 10(A), symbol S shows a recording material, and symbols D1, D2, and D3 show printing positions according to both recording modes 316 and 317. In the first recording mode, only the recording head 316 is driven to eject ink droplets onto the respective printing positions D1–D3, and the ink droplets I1–I3 are deposited on the recording material S, as shown in FIG. 10(B).

In the second recording mode, on the other hand, both recording heads 316 and 317 are driven to eject ink droplets I1–I3 from the recording head 316 to overlap the ink droplets I11–I13 ejected from the recording head 317. As a result, the state shown in FIG. 10 can be obtained. In this manner, ink ejection (sputtering) can be carried out in two runs for the same image element. According to the second recording mode, a reproduced image with a substantially equal transmission density to that of image formed on the plane paper can be obtained on a film having a defect that image density of image formed thereon would be insufficient, if recording is performed in an equal recording density to that of the plane paper, owing to the high transmittance of the film.

Figure 11A:
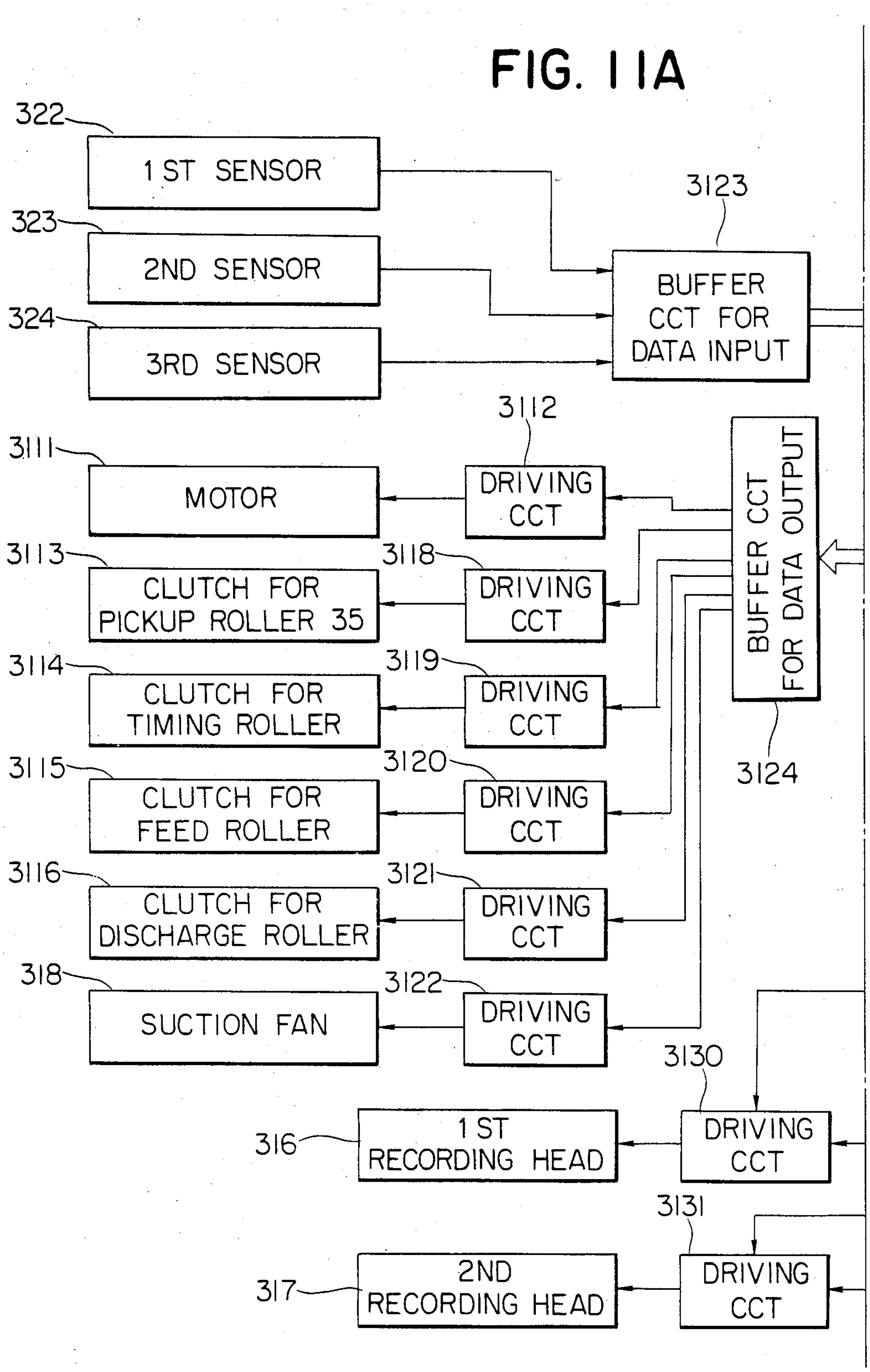
FIG. 11 composed of FIGS. 11A and 11B is a block diagram showing the control section of the apparatus of FIG. 9.
Figure 11B:
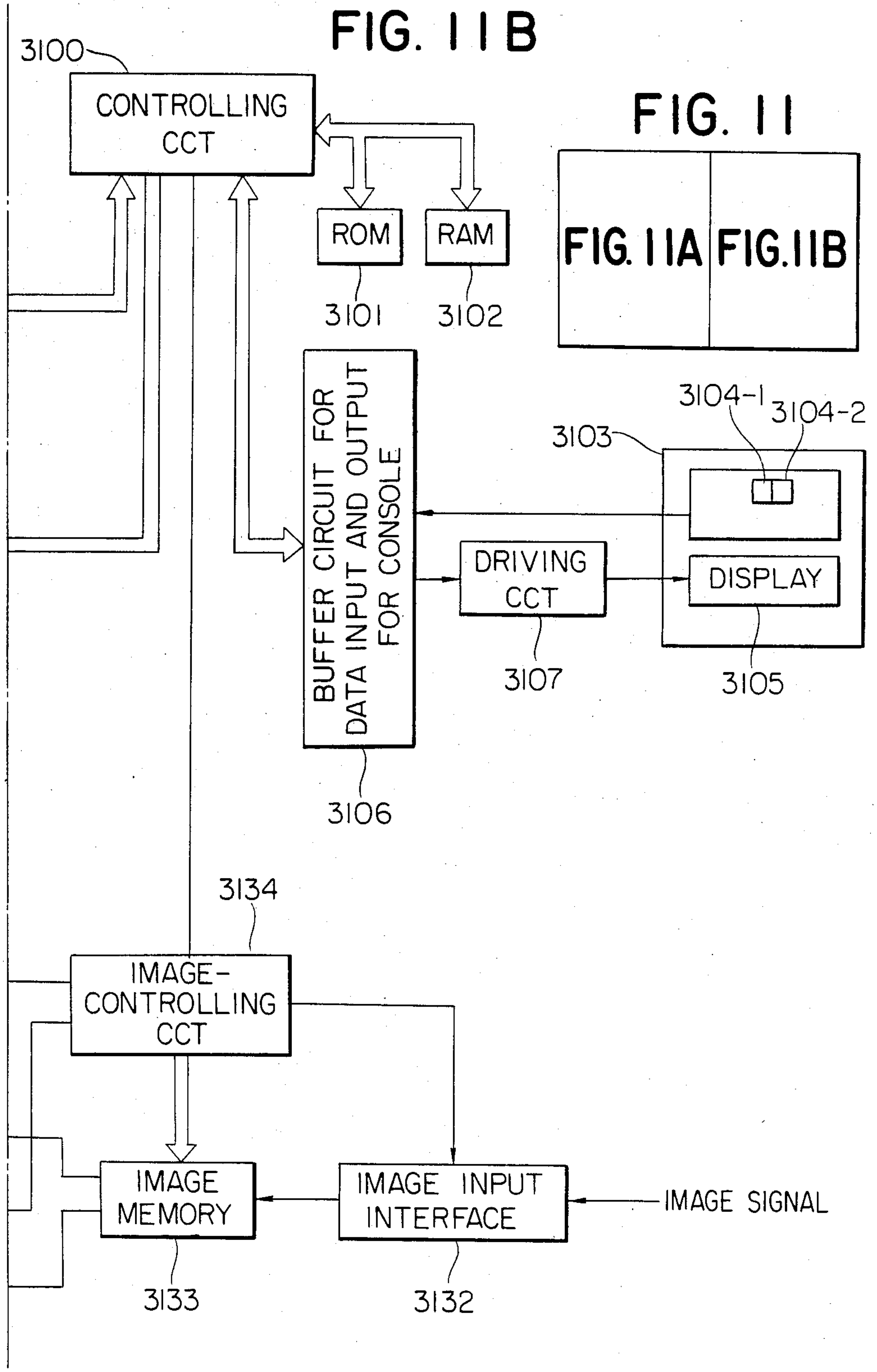

In FIG. 11, a control system in the apparatus of FIG. 9 is shown, where an image is formed according to the first and second recording mode, and numeral 3100 is a controlling circuit for controlling the driving of the respectived sections, numeral 3101 is a read-only memory (ROM) encasing a control program, etc.; numeral 3102 is a freely readable and writable random-access memory (RAM); numeral 3103 is an operating section. The operating section has, together with an operation section switch panel for designating the normal recording conditions such as number of recording copies, recording image density, etc., first and second mode-designating switches 3104-1 and 3104-2 for designating the first and second recording mode, respectively, and further has a display 3105 for displaying recording conditions, etc.

The input signal from the operating section 3103 is supplied to the controlling section 3100 through a buffer circuit 3106 for data input and output. Furthermore, a driving circuit 3107 is subjected to driving control from the controlling circuit 3100 through the buffer circuit 3106, whereby display is controlled in the display 3105.

Numeral 3111 designates motors as driving sources for the respective rollers and numeral 3112 is a driving circuit for on-off control of the motors 3111. Numerals 3113 through 3116 are motor clutches for transferring motor revolution power to the pickup roller 35, and pairs of rollers 37, 38, 39, and 320 and are subjected to on-off control through driving circuits 3118 through 3121, respectively.

Numeral 3122 is a driving circuit for on-off control of the suction fan 318. In the controlling circuit 3100, driving signals are supplied to the respective driving circuits through a buffer circuit for data output 3124 on the basis of the detection signals supplied from the respective sensors 322, 323 and 324 through a buffer circuit for data input 3123 to control driving of the conveying system.

Numerals 3130 and 3131 are driving circuits for driving the first and second ink jet recording heads 316 and 317, and in image signal corresponding to the image information read by the image reading means not shown in the drawing is supplied to both driving circuits 3130 and 3131 through an image input interface 3132 and an image memory 3133. Furthermore, a driving signal from the controlling circuit 3100 is supplied to the driving circuits 3130 and 3131 through an image-controlling circuit 3134. The respective head 316 or 317 is energized by the driving circuit 3130 or 3131 on the basis of these two signals to form an image on the recording paper or film conveyed from the cassette 21.

Figure 12A:
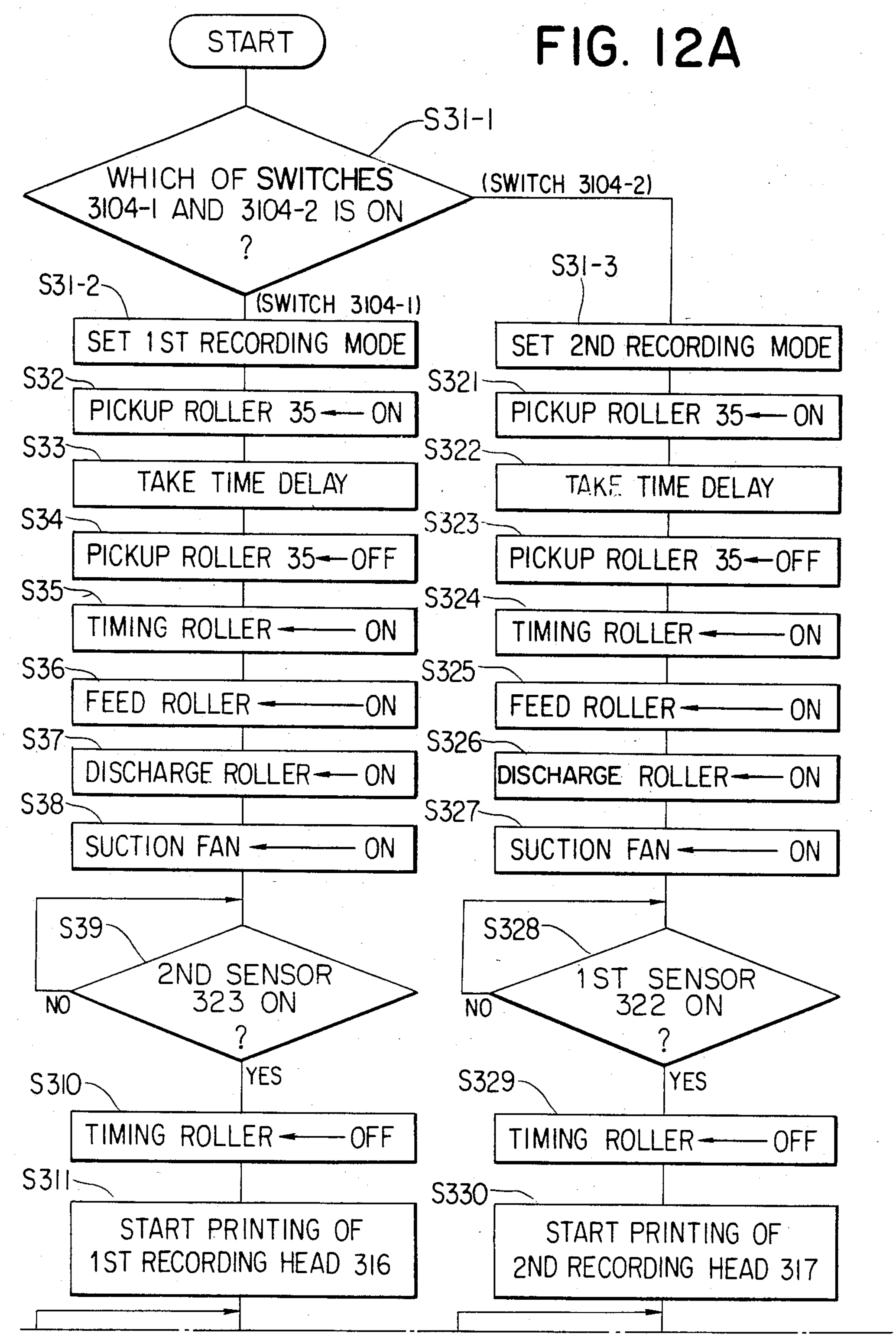
FIG. 12 composed of FIGS. 12A and 12B is a flow chart showing the recording operation in the apparatus of FIG. 9.
Figure 12B:
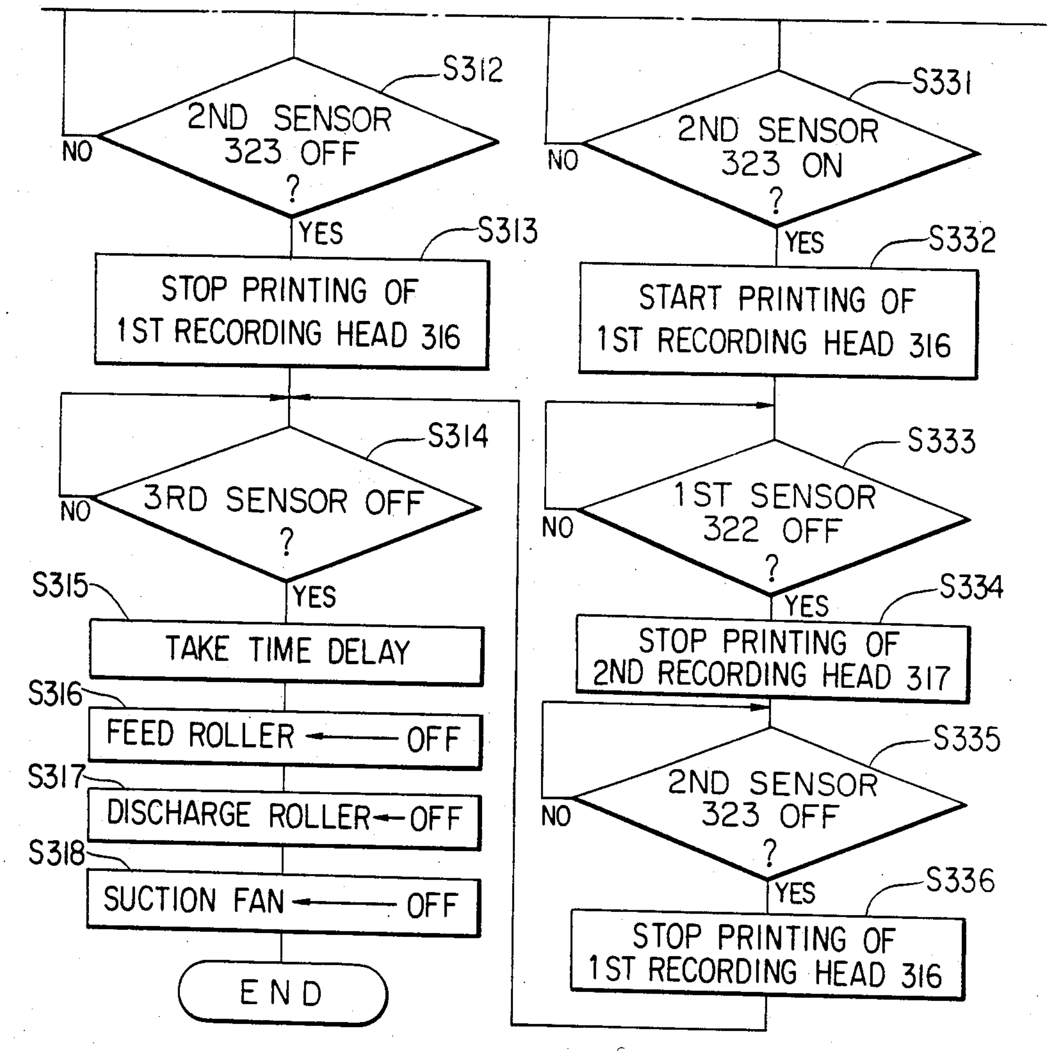
Figure 12:
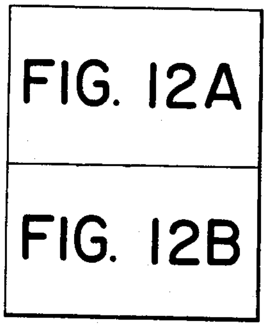

In FIG. 12 are shown recording operations onto a sheet of recording material in the apparatus of FIG. 9, where step S31-1 judges which of the mode-designating switches 3104-1 and 3104-2 is on. When switch 3104-1 is on, step S31-2 follows, and the recording mode is set to the first recording mode, whereas, when the switch 3104-2 is on, step S31-3 follows to set the second recording mode.

When the first recording mode is set, step S32 follows to start revolution of pick-up roller 35, and the recording material is conveyed from the cassette 31 toward the pair of timing rollers 37. Thereby the recording paper encased in the cassette is conveyed. Step S33 is provided with sufficient conveying time until the leading edge of the recording paper has been engaged into the pair of timing rollers 37, and step S34 stops revolution of pick-up roller 35. Then, steps S35, S36, S37 and S38 follow successively to start revolution of the pair of timing rollers 37, the pair of feed rollers 38 and 39 and the pair of discharge rolelrs 320 and to turn the suction fan 318 on at the same time. As a result, the recording paper can reach the pair of feed rollers 38 through the pair of timing rollers 37 and can be further conveyed through the pair of feed rollers 38.

Step S 39 judges whether or not the leading edge of the conveyed recoridng paper is detected by the second sensor 323. When the leading edge is detected, signed "yes" is transmitted, and step S310 follows to stop revolutions of the pair of timing rollers 37. Then, in step S311, the first ink jet recording head 316 is driven to start printing onto the recording paper. The printing operation is continued until the trailing end of the recording paper has been detected by the second sensor 323. That is, when the trailing edge of the recording paper is detected in step S312, step S313 follows to stop the printing operation.

The recording paper with an image thus formed on its surface is conveyed toward the pair of discharge rollers 320 through the pair of feed rollers 39, and discharged further toward the discharge tray 321 through the pair of discharge rolers 320. When the trailing end of the recording paper is detected by the third sensor 324 in step S314, step S315 follows to provide a sufficient conveying time until the recording paper has been discharged into the discharge tray 321. Then, steps S316 through S318 follow successively to stop driving of the pair of feed rollers 38 and 39, the pair of discharge rollers 320 and the suction fan 318. One sequence of recording operations for the recording paper according to the first recording mode is completed in the manner as described above.

Now, the operations when the switch 3104-2 turns on will be described below.

In this case, step S31-1 proceeds to step S321 through step S31-3, as described above. Step S321 starts revolution of pick-up roller 35 to convey a recording material from the cassette 31 toward the pair of timing rollers 37. A transparent resin film is encased in the cassette 31 and is fed. Step S322 is provided with sufficient conveying time until the leading edge of the transparent resin film has been engaged into the pair of timing rollers 37, and step 323 stops revolution of pick-up roller 35. Then, steps S324, S325, S326 and S327 follow successively to start revolutions of the pair of timing rollers 37, the pair of feed rollers 38 and 39, and the pair of discharge rollers 320, and to turn the suction fan 318 on at the same time. As a result, the transparent resin film can reach the pair of feed rollers 38 through the pair of timing rollers 37, and can be further conveyed through the pair of feed rollers 38.

Step S328 judges whether or not the leading edge of the conveyed transparent resin film is detected by the first sensor 322. When the leading edge is detected, signal "yes" is transmitted, and step S329 follows to stop revolution of the pair of timing rolers 37. Then, in step S330, the second ink jet recording head 317 is driven to start printing onto the transparent resin film. The printing operation is continued until the trailing edge of the transparent resin film has been detected by the first sensor 322. That is, when the trailing edge of the transparent resin film is detected in step S333, step S334 follows to stop the printing operation of the second ink jet recording head 317. On the other hand, when the leading edge of the film conveyed toward the first ink jet recording head 316 is detected by the second sensor 323 during the printing by the head 317, the step S331 advances into the step S332 to make the first ink jet recording head 316 start printing operation onto the film. In this manner, two runs of recording-liquid deposition can be performed onto the film. The printing operation of the first ink jet recording head 316 is continued until the trailing edge of the transparent resin film has been detected by the second sensor 323. That is, when the trailing edge of the film is detected in step S335, step S336 follows to stop the printing operation of the second ink jet recording head 316.

The transparent resin film with an image thus formed on its surface is conveyed toward the pair of discharge rollers 320 through the pair of feed rollers 39, and discharged further toward the discharge tray 321 through the pair of discharge rollers 320. When the trailing edge of the transparent resin film is detected by the third sensor 324, step S315 follows to provide sufficient conveying time until the transparent resin film has been discharged into the discharge tray 321. Then, steps S315 through S318 follow successively to stop driving of the pair of feed rollers 38 and 39, the pair of discharge rollers 320 and the suction fan 318. One sequence of recording operations for the transparent resin film according to the second recording mode is completed in the manner as described above.

In the foregoing embodiment, two recording heads are provided and the ink droplet ejection (sputtering) is carried out in two runs for one and the same image element in the second recording mode suitable for recording on a film, but the run number of the recording-liquid deposition is not restricted thereto. That is, when an equal density is designated, a transmission density substantially equal to that of a reproduced image by plane paper recording must be obtained in a reproduced image by film recording. For example, three recording heads can be provided, and three runs of recording-liquid deposition can be performed by driving all of the heads in the recording onto the film, whereas in the recording onto plane paper, two of these three heads can be selected to perform two runs of recording-liquid deposition.

As described above, the present apparatus for recording has a plurality of recording means, where at least two recording means are driven in the case of a light-transmitting recording material to perform a plurality of recording-liquid depositon for the same image element, so that a reproduced image with a practically sufficient transmission density can be obtained even on a light-transmitting recording material. The trouble appearing when a transmitted image is observed, that is, an insufficient density of image formed on a light-transmitting recording material due to a large transmittance, can be eliminated.

In the present apparatus for recording, the recording means is not restricted only to the ink jet recording process, but, for example, a recording means of heat transfer process can be also used.

What we claimed is:

1. An apparatus for recording, which apparatus comprises first recording means for recording an image in a first recording mode by depositing droplets of recording liquid to form image elements on a reflective recording material and second recording means for recording an image in a second recording mode by depositing droplets of recording liquid to form image elements on a light-transmitting recording material, wherein image elements are formed in the recording made in a single recording operation and image elements are formed in the second recording mode in a plurality of recording operations so that at least two droplets of the same color recording liquid are deposited per image element on the light-transmitting recording material.

2. An apparatus according to claim 1, wherein said recording means includes ink jet means.

* * * * *

UNITED STATES PATENT AND TRADEMARK OFFICE

CERTIFICATE OF CORRECTION

PATENT NO. : 4,721,968

DATED : January 26, 1988

INVENTOR(S) : RYUICHI ARAI, ET AL.

It is certified that error appears in the above-identified patent and that said Letters Patent is hereby corrected as shown below:

AT [56] IN REFERENCES CITED

Under U.S. Patent Documents, add the following:

| | | | |
|---|---|---|---|
| --4,115,788 | 9/1978 | Takano et al. | ..... 346/75 |
| 4,223,320 | 9/1980 | Paranjpe et al. | ..... 346/75 |
| 4,272,771 | 6/1981 | Furukawa et al. | ..... 346/75 |
| 4,367,482 | 1/1983 | Heinzl | ..... 346/140R |
| 4,401,991 | 8/1983 | Martin | ..... 346/75 |

IN THE DRAWINGS

Figure 2B:
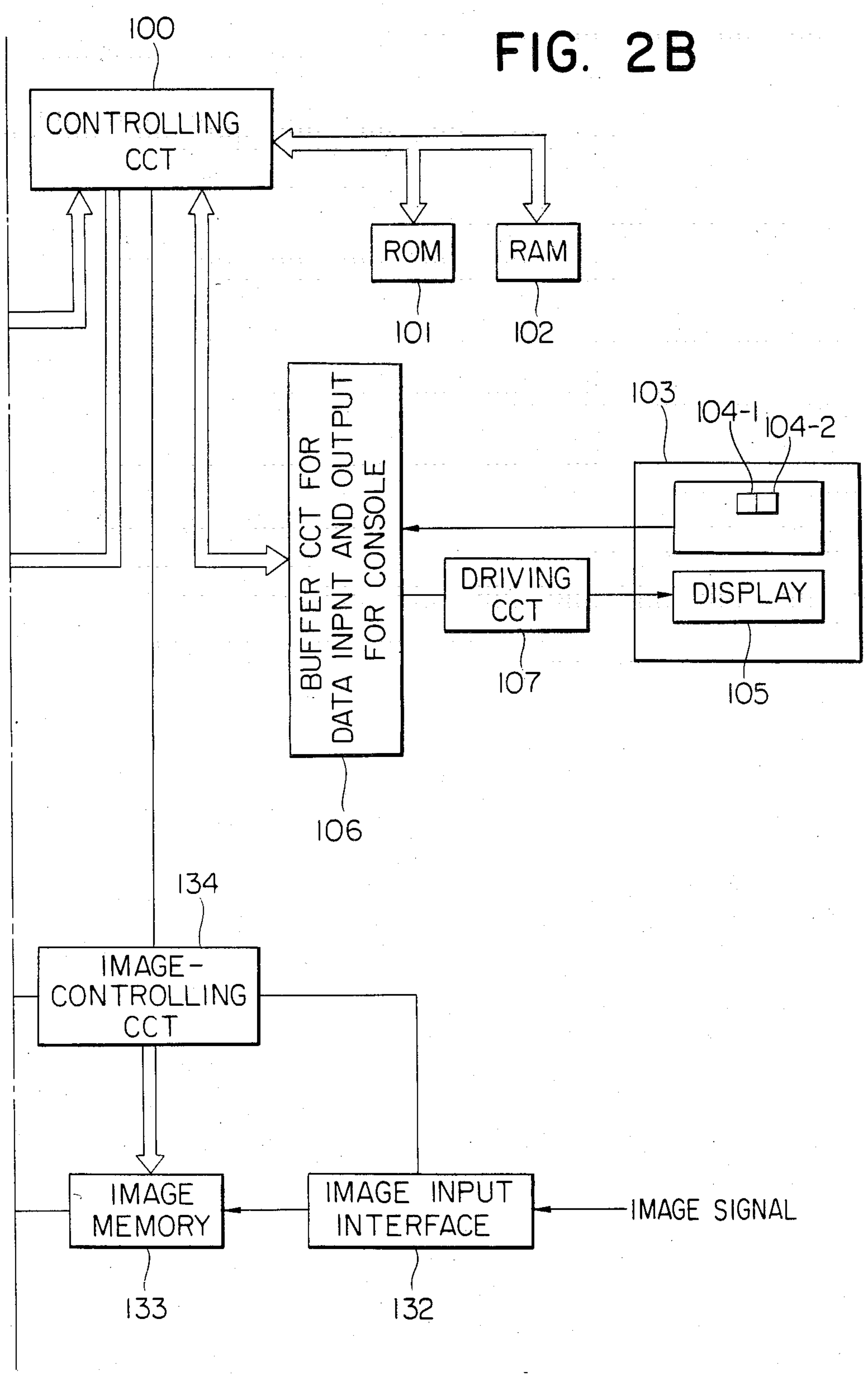

Sheet 3, Figure 2B, in box 106, "INPNT" should read --INPUT--.
Sheet 10, Figure 7B, in box 2106, "INPNT" should read --INPUT--.

COLUMN 1

Line 68, "plane" should read --plain--.

COLUMN 3

Line 32, "FIGS. 6A(A) through (C)" should read --FIGS. 6(A) through (C)--.
Line 41, "other" should read --another--.

COLUMN 4

Line 17, "image," should read --image--.

UNITED STATES PATENT AND TRADEMARK OFFICE

CERTIFICATE OF CORRECTION

PATENT NO. : 4,721,968

DATED : January 26, 1988

INVENTOR(S) : RYUICHI ARAI, ET AL.

It is certified that error appears in the above-identified patent and that said Letters Patent is hereby corrected as shown below:

COLUMN 6

Line 35, "panellists." should read --panelists.--.
Line 36, "panellists" should read --panelists--.
Line 42, "lists" should read --ists--.

COLUMN 7

Line 15, "rollers" should read --rollers;--.
Line 68, "plane" should read --plain--.

COLUMN 8

Line 34, "plane" should read --plain--.
Line 39, "plane" should read --plain--.
Line 54, "plane" should read --plain--.
Line 58, "plane" should read --plain--.

COLUMN 9

Line 4, "plane" should read --plain--.
Line 38, "feed roller 9" should read --feed rollers 9--.
Line 43, "have" should read --has--.

COLUMN 10

Line 2, "plane" should read --plain--.
Line 13, "plane" should read --plain--.
Line 17, "rollers" should read --rollers;--.

UNITED STATES PATENT AND TRADEMARK OFFICE
CERTIFICATE OF CORRECTION

PATENT NO. : 4,721,968 Page 3 of 4

DATED : January 26, 1988

INVENTOR(S) : RYUICHI ARAI, ET AL.

It is certified that error appears in the above-identified patent and that said Letters Patent is hereby corrected as shown below:

COLUMN 11

Line 23, "plane" should read --plain--.
Line 27, "plane" should read --plain--.
Line 39, "respectived" should read --respective--.
Line 42, "(RAM)" should read --(RAM);--.
Line 49, "respectively" should read --respectively,--.

COLUMN 12

Line 24, "step S-21-3" should read --step S21-3--.
Line 30, "Steps S23" should read --Step S23--.
Line 41, "Steps S29" should read --Step S29--.

COLUMN 13

Line 11, "step 223" should read --step S223--.

COLUMN 14

Line 2, "plane" should read --plain--.
Line 7, "proces" should read --process--.
Line 10, "plane" should read --plain--.
Line 31, "menas." should read --means.--.
Line 41, "designated" should read --designated,--.
Line 50, "and" (first occurrence) should be deleted.

COLUMN 15

Line 24, "plane" should read --plain--.
Line 28, "plane" should read --plain--.
Line 33, "respectived" should read --respective--.

UNITED STATES PATENT AND TRADEMARK OFFICE
CERTIFICATE OF CORRECTION

PATENT NO. : 4,721,968

DATED : January 26, 1988

INVENTOR(S) : RYUICHI ARAI, ET AL.

It is certified that error appears in the above-identified patent and that said Letters Patent is hereby corrected as shown below:

COLUMN 16

Line 3, "in" should read --an--.
Line 33, "discharge rolelrs 320" should read --discharge rollers 320--.
Line 39, "recoridng" should read --recording--.
Line 40, "signed" should read --sign--.
Line 54, "discharge rolers 320." should read --discharge rollers 320.--.

COLUMN 17

Line 20, "timing rolers 37." should read --timing rollers 37.--.

COLUMN 18

Line 12, "plane" should read --plain--.
Line 17, "plane" should read --plain--.
Line 36, "claimed" should read --claim--.
Line 45, "recording made" should read --first recording mode--.

Signed and Sealed this

Twenty-fifth Day of April, 1989

*Attest:*

DONALD J. QUIGG

*Attesting Officer* *Commissioner of Patents and Trademarks*